United States Patent
Fan et al.

(10) Patent No.: US 10,038,498 B1
(45) Date of Patent: Jul. 31, 2018

(54) APPARATUS AND METHODS FOR TIMING TONE BASED TRANSMITTER SKEW ALIGNMENT IN AN OPTICAL COMMUNICATION SYSTEM

(71) Applicant: INPHI CORPORATION, Santa Clara, CA (US)

(72) Inventors: Shu Hao Fan, Sunnyvale, CA (US); Damian Alfonso Morero, Cordoba (AR); Mario Rafael Hueda, Cordoba (AR)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/256,173

(22) Filed: Sep. 2, 2016

Related U.S. Application Data

(60) Provisional application No. 62/214,404, filed on Sep. 4, 2015, provisional application No. 62/346,296, filed on Jun. 6, 2016.

(51) Int. Cl.
| | |
|---|---|
| *H04B 10/08* | (2006.01) |
| *H04B 10/079* | (2013.01) |
| *H04B 10/50* | (2013.01) |
| *H04B 10/61* | (2013.01) |
| *H04B 10/40* | (2013.01) |
| *H04L 25/03* | (2006.01) |

(52) U.S. Cl.
CPC ....... *H04B 10/07955* (2013.01); *H04B 10/40* (2013.01); *H04B 10/50* (2013.01); *H04B 10/61* (2013.01); *H04L 25/03* (2013.01)

(58) Field of Classification Search
CPC .. H04B 10/07955; H04B 10/40; H04B 10/50; H04B 10/61; H04L 25/03

USPC .......................................................... 398/38
See application file for complete search history.

(56) References Cited

U.S. PATENT DOCUMENTS

| | | |
|---|---|---|
| 8,644,420 B2 | 2/2014 | Khatana et al. |
| 8,761,609 B1 | 6/2014 | Agazzi et al. |
| | (Continued) | |

OTHER PUBLICATIONS

Diego E. Crivelli et al., "Architecture of a Single-Chip 50 Gb/s DP-QPSK/BPSK Transceiver With Electronic Dispersion Compensation for Coherent Optical Channels", IEEE Transactions on Circuits and Systems, Apr. 2014, pp. 1012-1025, vol. 61, No. 4, IEEE.
(Continued)

*Primary Examiner* — M. R. Sedighian
(74) *Attorney, Agent, or Firm* — Richard T. Ogawa; Ogawa P.C.

(57) ABSTRACT

Apparatus and method for transmitter alignment in an optical communication system are provided. In certain configurations, a method of correcting for transmitter skew is provided. The method includes generating an optical signal using a transmitter based on an in-phase (I) component and a quadrature-phase (Q) component of a transmit signal, the optical signal having a baud rate that is based on a timing tone. The method further includes receiving the optical signal as an input to a receiver, and generating a signal vector representing the optical signal using the receiver. The signal vector includes an I component and a Q component. The method further includes calculating a power of the timing tone based on processing the signal vector using a tone power calculator of the receiver, and correcting for a skew of the transmitter based on the calculated power.

25 Claims, 22 Drawing Sheets

(56) References Cited

U.S. PATENT DOCUMENTS

| | | | |
|---|---|---|---|
| 9,036,751 | B1 | 5/2015 | Wang et al. |
| 9,071,364 | B1 * | 6/2015 | Voois et al. |
| 9,184,834 | B1 * | 11/2015 | Zhang .................. H04B 10/50 |
| 9,337,934 | B1 | 5/2016 | Agazzi et al. |
| 9,379,878 | B1 | 6/2016 | Lugthart et al. |

OTHER PUBLICATIONS

Damián A. Morero et al., "Design Tradeoffs and Challenges in Practical Coherent Optical Transceiver Implementations", Journal of Lightwave Technology, Jan. 1, 2016, pp. 121-136, vol. 34, No. 1, IEEE.

* cited by examiner

APPARATUS AND METHODS FOR TIMING TONE BASED TRANSMITTER SKEW ALIGNMENT IN AN OPTICAL COMMUNICATION SYSTEM

CROSS-REFERENCE TO RELATED APPLICATIONS

This application claims the benefit of priority under 35 U.S.C. § 119(e) of U.S. Provisional Patent Application No. 62/214,404, filed Sep. 4, 2015 and titled "TRANSMITTER ALIGNMENT IN AN OPTICAL COMMUNICATION SYSTEM," and of U.S. Provisional Patent Application No. 62/346,296, filed Jun. 6, 2016 and titled "FLEXIBLE CODING AND MODULATION TECHNIQUES FOR NEXT GENERATION DSP-BASED COHERENT SYSTEMS." Each of the above-identified provisional applications is incorporated by reference herein in its entirety for all purposes.

BACKGROUND

Field

This disclosure relates to methods and systems for high-speed optical communications.

Description of the Related Technology

There has been widespread adoption of personal electronic devices including smart phones, tablets, notebooks, laptops, digital camera, video recorders, gaming systems, etc. These devices are being used to communicate ever-increasing quantities of data, such as between different personal electronic devices, between personal electronic devices and peripheral devices (for example, display devices, external storage devices, etc.), and the like.

Enormous data communication demands are also present in a variety of other contexts. For example, data centers are communicating ever-increasing amounts of data, and also require fast and reliable data communication between devices. The various methods and systems disclosed herein provide various improvements and benefits vis-à-vis existing high-speed communication technologies.

SUMMARY

In various embodiments, an integrated circuit for an optical communication system includes a receiver. The receiver includes an analog front-end including analog-to-digital converters (ADCs) that convert analog signal data representing an optical signal received from a transmitter into digital signal data. The digital signal data includes a digital representation of an in-phase (I) component and a quadrature-phase (Q) component of the optical signal sent from the transmitter. The receiver processes the analog signal data representing the optical signal to detect transmitter skew values, which are used to provide alignment or deskew of the I and Q components.

In various embodiments, the optical signal has a baud rate or symbol rate that is based on a timing tone of the optical signal. Additionally, the receiver calculates a power of the timing tone of the optical signal, such as a tone power and/or side tone power of the timing tone. Additionally, a desired amount of skew adjustment to align the I component and the Q component of the optical signal can be obtained from the calculated power of the timing tone. A skew compensation module can be used to provide the desired amount of deskew between I and Q components transmitted from the transmitter, thereby providing transmitter alignment.

In various embodiments, the receiver includes a digital signal processing circuit that processes the digital signal data from the analog front-end for at least one of feed forward equalization or carrier recovery prior to correcting for skew between the I component and a Q component. In certain configurations, a transmitter error compensator including a multi-input multi-output (MIMO) equalizer and a single-input single-output (SISO) equalizer can be used to compensate for transmitter errors, such as skew between the I component and a Q component of the digital signal output from the digital signal processing circuit after feed forward equalization or carrier recovery and/or drift in bias voltage of the optical transmitter. Various embodiments of the integrated circuit can further include a decision slicer that slices the skew compensated digital signal output.

The teachings herein are applicable to optical signals of a wide variety of types. For example, the optical signal can include optical signals with complex modulation formats including, but not limited to, multi-level quadrature amplitude modulation (QAM), discrete multitoned (DMT) modulation, orthogonal frequency division multiplexing (OFDM), or phase-shift keying (PSK), (including, but not limited to, quadrature PSK or QPSK).

An innovative aspect of the subject disclosed herein is implemented in an integrated circuit comprising a receiver configured to process an analog signal vector representing an optical signal received from a transmitter. The receiver comprises an analog front-end and a digital signal processing circuit. The analog front-end is configured to convert the analog signal vector into a digital signal vector, wherein the digital signal vector comprises a digital representation of an in-phase (I) component and a quadrature-phase (Q) component of the optical signal. The digital signal processing circuit is configured to process the digital signal vector to recover data. The digital signal processing circuit comprises a transmitter error compensation system configured to compensate the digital signal vector for at least one of a transmit skew error of the transmitter or a modulator biasing error of the transmitter.

In various embodiments of the integrated circuit, the transmitter error compensation system can comprises an I signal path comprising a MIMO equalizer and a first SISO equalizer, and a Q signal path comprising the MIMO equalizer and a second SISO equalizer. The MIMO equalizer can be configured to compensate for the modulator biasing error of the transmitter. The first and second SISO equalizers can be configured to compensate for the transmit skew error of the transmitter. In various embodiments, the first and second SISO equalizers can be after the MIMO equalizer in the I and Q signal paths. The first SISO equalizer can be configured to generate an I component of a compensated digital signal vector, and the second SISO equalizer can be configured to generate a Q component of the compensated digital signal vector. The transmitter error compensation system can further comprise a slicer configured to generate an output digital signal vector based on slicing the compensated digital signal vector.

In various embodiments of the integrated circuit the transmitter error compensation system can further comprise a first digital adaption engine configured to control a plurality of coefficients of the first and second SISO equalizers based on a first error signal comprising a difference between the compensated digital signal vector and the output digital signal vector. The transmitter error compensation system can further comprise an error back propagation system configured to generate a second error signal based on the first error signal and the plurality of coefficients of the first and second SISO equalizers. The transmitter error compensation system can further comprise a second digital adaption engine configured to control a plurality of coefficients of the MIMO equalizer based on the second error signal. The transmitter error compensation system can be configured to adapt a plurality of coefficients of the first and second SISO equalizers based on a least mean squares (LMS) stochastic gradient algorithm.

In various embodiments of the integrated circuit, the receiver can be further configured to generate signal data representing a signal constellation of the digital signal vector. The transmitter error compensation system can be further configured to compensate for a linear distortion of the signal constellation. The optical signal can comprise a multi-level quadrature amplitude modulation (QAM) signal, a discrete multitoned (DMT) modulation signal, an orthogonal frequency division multiplexing (OFDM), or a phase-shift keying (PSK) signal. The digital signal vector can comprise data representing a single polarization modulation or a dual-polarization modulation. In various embodiments, the analog front-end can further comprises a tone power calculator configured to calculate a power of the timing tone, and to generate skew adjustment data for the transmitter based on the calculated power.

Another innovative aspect of the subject disclosed herein is implemented in a method of compensating for transmitter errors in an optical communication device. The method comprises: generating an analog signal vector representing an optical signal using a coherent optical receiver, wherein the optical signal is received from a transmitter; converting the analog signal vector into a digital signal vector using an analog front-end, wherein the digital signal vector comprises a digital representation of an in-phase (I) component and a quadrature-phase (Q) component of the optical signal; and processing the digital signal vector using a digital signal processing circuit, including compensating the digital signal vector for at least one of a transmit skew error of the transmitter or a modulator biasing error of the transmitter using a transmitter error compensation system.

Various embodiments of the method can further comprise compensating for the modulator biasing error of the transmitter using a MIMO equalizer of the transmitter error compensation system, and compensating for the transmit skew error of the transmitter using a plurality of SISO equalizers of the transmitter error compensation system. In various embodiments of the method compensating for the modulator biasing error can occur before compensating for the transmit skew error. The method can further comprise adapting a plurality of coefficients of the SISO equalizers based on a least mean squares (LMS) stochastic gradient algorithm.

Another innovative aspect of the subject disclosed herein is implemented in an integrated optical module comprising: an optics block configured to receive an optical signal from a transmitter via an optical cable, and to generate an analog signal vector representing the optical signal; and a receiver. The receiver comprises an analog front-end configured to convert the analog signal vector into a digital signal vector, wherein the digital signal vector comprises a digital representation of an in-phase (I) component and a quadrature-phase (Q) component of the optical signal; and a digital signal processing circuit configured to process the digital signal vector to recover data. The digital signal processing circuit comprises a transmitter error compensation system configured to compensate the digital signal vector for at least one of a transmit skew error of the transmitter or a modulator biasing error of the transmitter.

In various embodiments of the integrated optical module the transmitter error compensation system can comprise an I signal path comprising a MIMO equalizer and a first SISO equalizer, and a Q signal path comprising the MIMO equalizer and a second SISO equalizer. The MIMO equalizer can be configured to compensate for the modulator biasing error of the transmitter, and the first and second SISO equalizers can be configured to compensate for the transmit skew error of the transmitter. The first and second SISO equalizers can be after the MIMO equalizer in the I and Q signal paths. The transmitter error compensation system can be configured to adapt a plurality of coefficients of the first and second SISO equalizers based on a least mean squares (LMS) stochastic gradient algorithm. In various embodiments, the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

An innovative aspect of the subject discussed herein is implemented in a method of correcting for transmitter skew in an optical communication system. The method comprises: generating an optical signal using a transmitter based on an in-phase (I) component and a quadrature-phase (Q) component of a transmit signal, the optical signal having a baud rate that is based on a timing tone; receiving the optical signal as an input to a receiver; generating a signal vector representing the optical signal, the signal vector comprising an I component and a Q component; calculating a power of the timing tone based on processing the signal vector using a tone power calculator; and correcting for a skew of the transmitter based on the calculated power.

Various embodiments of the method can further comprise providing a plurality of different amounts of skew adjustment at the transmitter, and calculating the power of the timing tone for each of the different amounts of skew adjustment. The method can further comprise generating skew adjustment data based on the power calculations, and storing the skew adjustment data in a programmable memory associated with the transmitter. Various embodiments of the method can comprise changing an amount of skew between the I component and the Q component of the transmit signal based on a step size, and iteratively revising the step size until the calculated power indicates that the transmitter is substantially aligned. In various embodiments of the method, calculating the power of the timing tone can comprise calculating a tone power. In various embodiments of the method, determining the tone power can comprise calculating a value of the square of the absolute value of a complex signal, wherein the complex signal comprises the I component and the Q component of the signal vector. In various embodiments of the method, calculating the power of the timing tone can comprise calculating a side tone power. In various embodiments of the method, determining the side tone power can comprise calculating a value of a square of a complex signal, wherein the complex signal comprises the I component and the Q component of the signal vector. In some embodiments, calculating the power of the timing tone can comprise determining a value of a metric, wherein the metric comprises a function of at least one of a tone power or a side tone power of the timing tone. The optical signal can comprise a multi-level quadrature amplitude modulation (QAM) signal, a discrete multitoned (DMT) modulation signal, an orthogonal frequency division multiplexing (OFDM), or a phase-shift keying (PSK) signal.

The signal vector can comprise data representing a single polarization modulation or a dual-polarization modulation.

Another innovative aspect of the subject discussed herein can be implemented in an integrated circuit for an optical communications system comprising a receiver. The receiver comprises: an analog front-end configured to convert an analog signal vector representing an optical signal into a digital signal vector, the optical signal having a baud rate that is based on a timing tone; and a digital signal processing circuit configured to process the digital signal vector to recover data from symbols of the optical signal, wherein the symbols change at the baud rate. The analog front-end comprises a tone power calculator configured to calculate a power of the timing tone, and to generate skew adjustment data for a transmitter based on the calculated power.

In various embodiments of the integrated circuit, the tone power calculator can be configured to determine at least one of a tone power or a side tone power of the timing tone. In some embodiments, the tone power calculator can be configured to determine the power of the timing tone based on a value of the square of the absolute value of a complex signal representing an I component and a Q component of the analog signal vector. In some embodiments, the tone power calculator can be configured to determine the power of the timing tone based on a value of a square of a complex signal representing an I component and a Q component of the analog signal vector. The digital signal vector can comprise data representing a single polarization modulation or a dual-polarization modulation.

Various embodiments of the integrated circuit can further comprise a transmitter configured to control transmission of the optical signal to the receiver during a calibration cycle to align the transmitter. Various embodiments of the digital signal processing circuit can further comprise a transmitter error compensation system configured to compensate the digital signal vector for at least one of a transmit skew error of the transmitter or a modulator biasing error of the transmitter, wherein the transmitter error compensation system comprises an I signal path comprising a MIMO equalizer and a first SISO equalizer, and a Q signal path comprising the MIMO equalizer and a second SISO equalizer.

Yet another innovative aspect of the subject discussed herein is implemented in an optical transceiver module comprising: an optical receiver configured to receive an optical signal from an optical cable and to generate an analog signal vector representing the optical signal, wherein the optical signal has a baud rate that is based on a timing tone; and a transceiver. The transceiver comprises a receiver configured to process the analog signal vector to generate a digital signal vector comprising a digital representation of the analog signal vector, and to process the digital signal vector to recover data from symbols of the optical signal, wherein the symbols change at the baud rate. The receiver comprises a tone power calculator configured to calculate a power of the timing tone, and to generate skew adjustment data based on the calculated power.

In various embodiments, the tone power calculator can be further configured to determine at least one of a tone power or a side tone power of the timing tone. In some embodiments, the tone power calculator can be further configured to determine the power of the timing tone based on a value of the square of the absolute value of a complex signal representing an I component and a Q component of the analog signal vector. In various embodiments, the tone power calculator can be further configured to determine the power of the timing tone based on a value of the absolute value of a square of a complex signal representing an I component and a Q component of the analog signal vector. The digital signal vector can comprise data representing a single polarization modulation or a dual-polarization modulation. Various embodiments of the transceiver can further comprise a transmitter, wherein the transmitter controls transmission of the optical signal to the receiver during a calibration cycle to align the transmitter. Various embodiments of the optical transceiver module can further comprise a programmable memory configured to store the skew adjustment data.

BRIEF DESCRIPTION OF THE DRAWINGS

Example implementations disclosed herein are illustrated in the accompanying schematic drawings, which are for illustrative purposes only.

FIG. 4A-1 shows a simulated oscilloscope output of an example of a modulated optical signal s(t) using a direct-detection optical receiver when the amount of skew between I and Q components is very small. FIG. 4A-2 illustrates the Fourier Transform of the square of the magnitude of the optical signal.

FIG. 4B-1 shows a simulated oscilloscope output of an example of a modulated optical signal s(t) detected using a direct-detection optical receiver when the amount of skew between I and Q components is 0.5 Baud. FIG. 4B-2 illustrates the Fourier Transform of the square of the magnitude of the optical signal.

FIG. 5A-1 illustrates the simulated complex constellation for the signal s(t) when the amount of skew between I and Q components is very small. FIG. 5A-2 illustrates the simulated complex constellation for the timing tone represented by $|s(t)|^2$ for the signal s(t) illustrated in FIG. 5A-1. FIG. 5A-3 illustrates the simulated complex constellation for the side tone represented by $s(t)^2$ for the signal s(t) illustrated in FIG. 5A-1.

FIG. 5B-1 illustrates the simulated complex constellation for the signal s(t) when the amount of skew between I and Q components is 0.5 Baud. FIG. 5B-2 illustrates the simulated complex constellation for the timing tone represented by $|s(t)|^2$ for the signal s(t) illustrated in FIG. 5B-1. FIG. 5B-3 illustrates the simulated complex constellation for the side tone represented by $s(t)^2$ for the signal s(t) illustrated in FIG. 5B-1.

FIG. 6A-1 is a schematic diagram of an embodiment of an optical transceiver system including a coherent optical receiver and a tone power calculator. FIG. 6A-2 is a schematic diagram of another embodiment of an optical transceiver system including a direct-detection optical receiver and a tone power calculator.

DETAILED DESCRIPTION OF EMBODIMENTS

Figure 1:
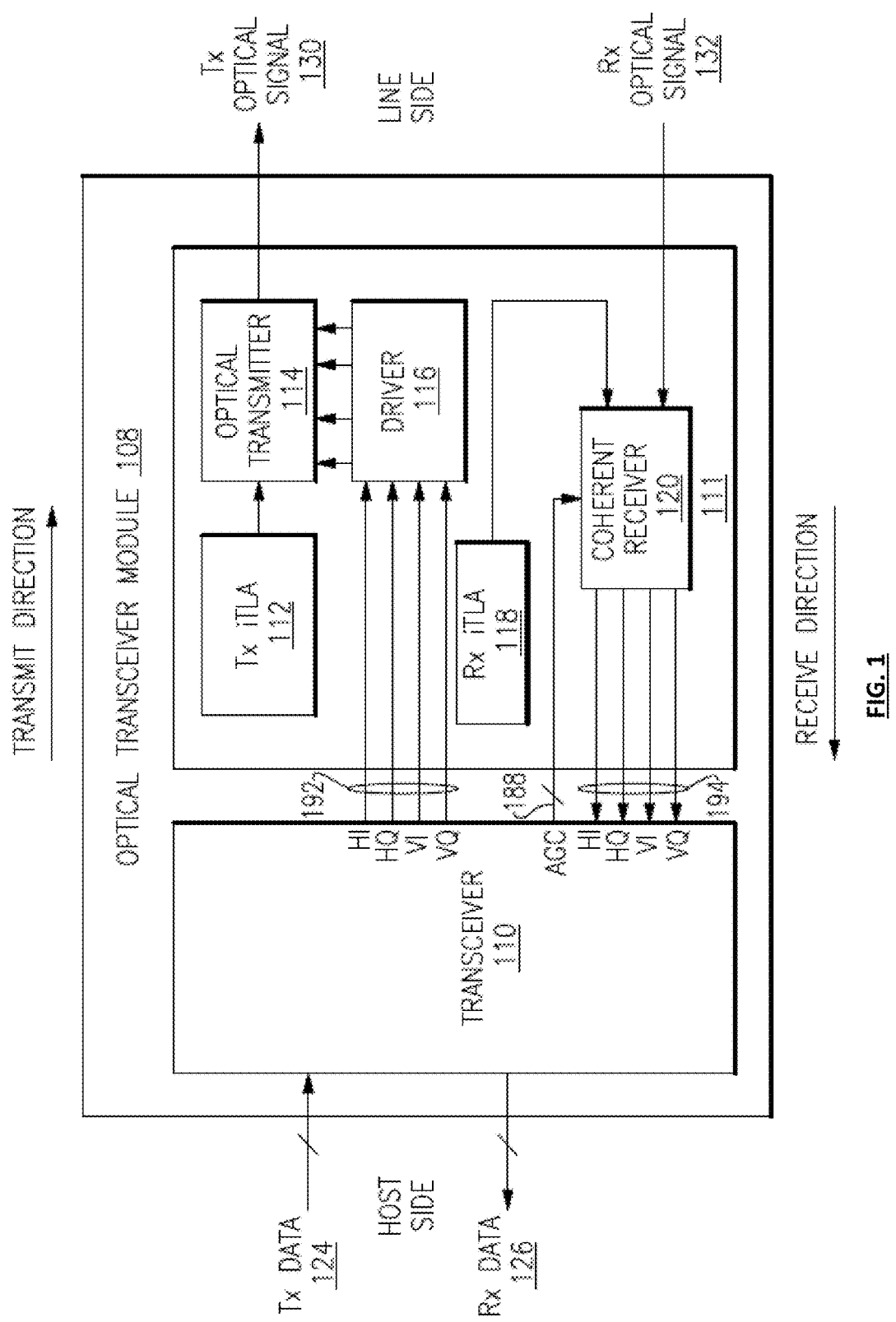
FIG. 1 is a schematic diagram of one embodiment of an optical transceiver module.

The following detailed description is directed to certain implementations for the purposes of describing the innovative aspects. However, the teachings herein can be applied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

As will be apparent from the following description, the innovative aspects may be implemented in any high-speed communication system that is configured to transmit and receive data between electronic devices which can include laptops, notebooks, tablets, desk-top computers, data centers, gaming devices, data storage systems, input/output peripheral devices, display devices, etc. The innovative aspects may be implemented in or associated with data transport networks, storage area networks, enterprise networks, private networks, secure networks, financial networks, etc. Other uses are also possible.

A high-speed communication link can include an optical cable, such as a fiber-optic cable. Additionally, an optical transmitter positioned on one end of the optical cable can transmit data to an optical receiver positioned on the other end of the optical cable.

An optical transmitter can include optical modulators for transmitting optical signals over the optical cable. In one example, an optical transmitter includes a first optical modulator for generating in-phase (I) optical signal and a second optical modulator for generating a quadrature-phase (Q) optical signal. The optical modulators can be controlled using electrical I and Q transmit signals representing the I and Q optical signals.

However, the presence of skew between the electrical I and Q transmit signals can degrade transmission errors and/or degrade the reliability of data transmission. The skew can arise from a variety of sources, including, but not limited to, mismatches in on-chip and/or board conducting lines or traces and/or phase errors in clocks signals used to control timing of transmitter circuits, such as digital-to-analog converters (DACs), that generate the electrical I and Q transmit signals. Moreover, mismatches between optical modulators can also introduce skew. It is advantageous to detect and correct skew to improve the receiver performance and to increase the reliability of data transmission.

In certain implementations, the optical transmitter can also employ automatic bias control to bias the optical modulators to enhance the accuracy of transmissions. For example, an automatic bias controller can be used to control biasing of the optical modulators. For instance, the automatic bias controller can generate a first bias voltage that controls an offset of the first optical modulator, a second bias voltage that controls an offset of the second optical modulator, and a third bias voltage that controls a phase difference between the I and Q optical signals. Although automatic bias control can enhance the performance of communications over an optical cable, an automatic bias controller may not precisely control the bias voltages to the desired values. For example, the bias voltages can include small perturbations associated with dithering and/or the voltage levels of the bias voltages can drift due to a searching algorithm and/or a change in operating environment.

Accordingly, transmitter skew and/or errors in optical modulator bias voltages can lead to decoding errors at the optical receiver, such as burst errors and/or loss of frames. Sensitivity to errors in transmitter skew and/or modulator biasing can be exacerbated in applications using high-speeds and/or high-order modulation formats, such as 16-QAM or discrete multitoned (DMT) modulation.

Apparatus and method for alignment of I and Q components of a transmit signal are provided herein. In certain configurations, the skew between the I and the Q components of an optical signal transmitted by an optical transmitter can be received by a coherent optical receiver. A power of a timing tone of the optical signal can be measured from the I and the Q components recovered by the coherent optical receiver and the amount of deskew that would align the I and the Q components at the transmitter can be determined from the measured power of the timing tone. In certain implementations, the amount of deskew can be optimized using an iterative process that substantially maximizes the tone power of the timing tone and/or substantially minimizes the side tone power of the timing tone. The optimized deskew amount can be used to the align the I and the Q components of the electrical transmit signal that are used by the optical transmitter to modulate an optical carrier.

The teachings herein can be used to calibrate an optical transmitter to reduce the amount of skew between the I and the Q components of an optical signal. This can advantageously increase robustness of an optical link, increase dynamic range of the optical receiver, and/or improve link budget of the optical link.

The teachings herein can be used to align phase between the in-phase and quadrature phase components of a digital signal having a wide variety of formats, including, but not limited to, quadrature amplitude modulation (QAM), discrete multitoned (DMT) modulation, orthogonal frequency division multiplexing (OFDM), and phase-shift keying (PSK) (including, but not limited to, quadrature phase-shift keying (QPSK)) for both coherent and direct-detected systems. Although example signal formats have been provided, deskew or alignment can be applied to transmitters that generate other signals.

Examples of Optical Communication Devices

FIG. 1 is a schematic diagram of one embodiment of an optical transceiver module or integrated optical module 108. The optical transceiver module 108 includes a transceiver 110 and an optics block 111. In the illustrated embodiment, the optics block 111 includes a transmit integrated tunable laser assembly (Tx iTLA) 112, a receive integrated tunable laser assembly (Rx iTLA) 118, an optical transmitter 114, a driver 116, and a coherent receiver 120.

The optical transceiver module 108 receives transmit (Tx) data 124 from a host device on a host side, and processes the transmit data 124 to generate a transmit optical signal 130 for transmission over an optical cable on a line side. Additionally, the optical transceiver module 108 receives a receive (Rx) optical signal 132 from the optical cable, and processes the receive optical signal 132 to generate receive data 126 provided to the host device.

Although FIG. 1 illustrates one embodiment of an optical transceiver module, an optical transceiver module can be implemented in a wide variety of ways. For example, the optical transceiver module 108 of FIG. 1 can include more or fewer components and/or a different arrangement of components.

The optics block 111 can be implemented in a wide variety of ways. In one example, the optics block 111 is implemented to communicate over an optical cable based on Indium Phosphide (InP) modulator technology. In another example, the optics block 111 is implemented to communicate over an optical cable based on Lithium Niobate (LiNb) modulator technology. Although two examples of modulator technology have been provided, the teachings herein are applicable to a wide variety of modulator technologies.

In certain implementations, the transceiver 110 operates using a programmable host interface and/or programmable optical interface protocol, thereby enhancing flexibility by providing compatibility with a wide variety of host devices and/or optical networks. In one example, the transceiver 110 includes a host interface that can communicate using various standards such as, for example, 100 GE, OTU4, OTU3, and/or other interfacing standards. In another example, the transceiver 110 operates in conjunction with the optics block 111 to transmit and receive optical signals associated with a wide variety of optical communication protocols, including for example, QAM, DMT, and/or PSK (including, but not limited to, APSK and/or QPSK). The transceiver 110 can be implemented with internal mapping and framing capability to provide translation between the host interface protocol and the optical interface protocol. In certain implementations, the transceiver 110 has at least one of a programmable data rate or programmable error correction scheme.

The optical transceiver module 108 can communicate with a wide variety of host devices, including, but not limited to, a mobile computing device, a personal computing device, a workstation, a peripheral device, a hub, and/or a network router. In certain implementations, the transmit (Tx) data 124 and/or the receive (Rx) data 126 are digital electrical signals, such as multi-bit digital signals.

In the transmit direction of the optical transceiver module 108, the transceiver 110 processes the transmit data 124 received from the host side to generate an analog transmit signal vector 192. In one example, the analog transmit signal vector 192 includes four signals representing in-phase (I) and quadrature (Q) components for each of horizontal (H) and vertical (V) polarizations (represented as HI, HQ, VI, and VQ in FIG. 1). However, other implementations are possible.

In the receive direction of the optical transceiver module 108, the transceiver 110 receives an analog receive signal vector 194 from the coherent receiver 120 and performs signal processing functions that can include, for example, equalization and/or timing recovery to generate the receive data 126. In one example, the analog receive signal vector 194 includes four signals representing I and Q components for each of horizontal and vertical polarizations (represented as HI, HQ, VI, VQ in FIG. 1). However, other implementations are possible.

In the optics block 111, the Tx iTLA 112 generates an optical carrier signal and provides the optical carrier signal to the optical transmitter 114. The driver 116 operates in combination with the optical transmitter 114 to modulate the HI/HQ and VI/VQ signals onto optical carriers in horizontal and vertical polarizations, respectively, for transmission over an optical cable on the line side. In the receive direction, the Rx iTLA 118 generates a local oscillator (LO) signal at approximately the carrier frequency of the received optical signal 132. The coherent receiver 120 receives the LO signal from the Rx iTLA 118 and demodulates the incoming optical signal 132 to baseband to generate the analog receive signal vector 194.

In one embodiment, the transceiver 110 generates an automatic gain control (AGC) signal 188, which provides feedback to the coherent receiver 120 based on the strength of the analog receive signal vector 194. The AGC signal 188 may include a single signal or multiple signals. In one example, the AGC signal 188 includes four gain control signals for controlling gain of HI, HQ, VI, and VQ signals of the analog receive signal vector 194.

In certain implementations, the optical transceiver module 108 is implemented as a pluggable module that can be integrated in an optical communication system. Various features of the optical transceiver module 108 of FIG. 1 can be similar to those described in commonly-owned U.S. Pat. No. 9,071,364, issued Jun. 30, 2015, and titled "COHERENT OPTICAL TRANSCEIVER WITH PROGRAMMABLE APPLICATION MODES," which is herein incorporated by reference in its entirety for all purposes.

Differences in lengths and other characteristics in the signal paths along which the I and Q components for each of horizontal and vertical polarizations (represented as HI, HQ, VI, VQ in FIG. 1) travel before being encoded on the optical carrier generated by the Tx iTLA 112 by the optical transmitter 114 can result in a phase misalignment or skew between the I and Q components for each of horizontal and vertical polarizations (represented as HI, HQ, VI, VQ in FIG. 1). Skew can also arise from manufacturing variation and/or error. Transmitter skew can cause increased errors in the data recovered by the coherent receiver 120 and/or degrade link budget.

As described in further detail below, a power of a timing tone in the I and Q components for each of horizontal and vertical polarizations recovered by the coherent receiver 120 can be correlated to the skew between the I and Q components for each of horizontal and vertical polarizations at the optical transmitter 114. The transceiver 110 can be configured to align the I and Q components for each of horizontal and vertical polarizations at the output of the transceiver 110 such that the tone power of the timing tone is substantially maximized and/or the side tone power of the timing tone is substantially minimized. In this manner, the skew at the transmitter can be reduced.

In certain implementations, the optical transceiver module 108 is calibrated during a calibration cycle to reduce or eliminate skew between I and Q components of the analog transmit signal vector 192. The calibration cycle can occur, for instance, after manufacturing and prior to operation by an end-user in an optical network. In one example, the optical transmitter 114 is optically connected to the coherent receiver 120, such that optical transceiver module 108 is self-calibrated without a need for an external scope or modulation analyzer. In another example, one optical transceiver module is used to calibrate another optical transceiver module. For instance, a first optical transceiver module can be initially calibrated for skew, and thereafter used as a reference for calibrating other optical transceiver modules.

Thus, the coherent receiver 120 can be used to observe a power of a timing tone of an optical signal. The observations of the power of the timing tone are correlated to transmitter skew. Accordingly, a transmitter can transmit an optical signal for each of multiple skew adjustment values, and a value of skew adjustment corresponding to about the highest tone power and/or about the lowest side tone power can be selected. Additionally, the transmitter can be programmed with data corresponding to the selected skew adjustment value, such that the transmitter operates with the selected skew adjustment value during operation. For example, a programmable memory, such as a non-volatile memory, can be programmed with data corresponding to the selected skew adjustment value.

Accordingly, the coherent receiver 120 can observe a power of the timing tone for each of multiple values of transmitter skew adjustment to determine an appropriate amount of skew adjustment to apply to the transmitter. After the calibration cycle, the transmitter is programmed to operate with the selected amount of skew adjustment, such that the transmitter operates with reduced or eliminated transmit skew.

Although one specific implementation of an optical communication device is shown in FIG. 1, the teachings herein are applicable to wide variety of optical communication devices.

Example Optical Transmitter Architecture

Figure 2:
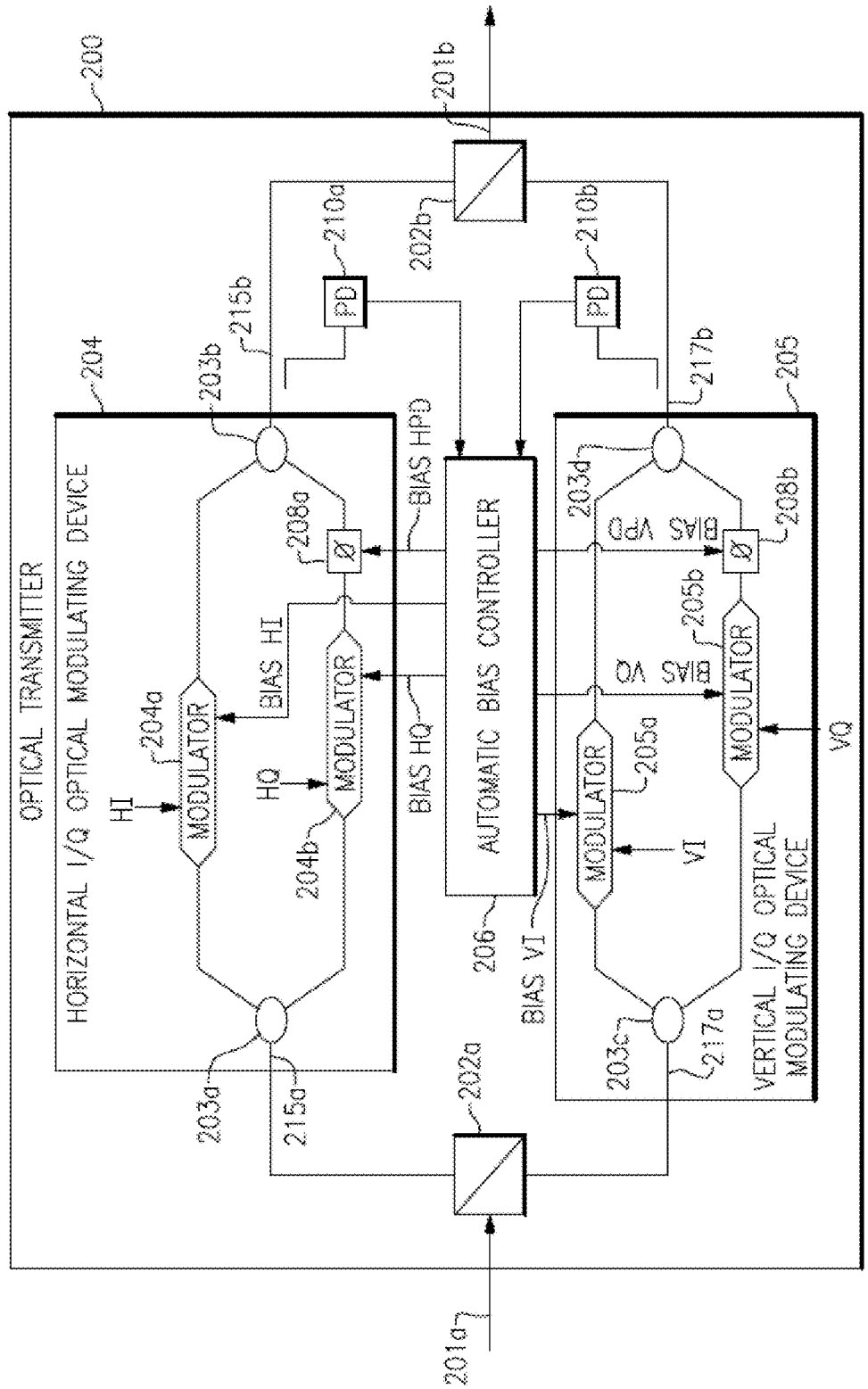
FIG. 2 is a schematic diagram of an implementation of an optical transmitter that can be employed to generate spectrally efficient optical signals.

FIG. 2 is a schematic diagram of an optical transmitter 200 that can be employed to generate spectrally efficient optical signals. The optical transmitter 200 includes an optical splitter 202a, an optical coupler 202b, a horizontal I/Q optical modulating device 204, a vertical I/Q optical modulating device 205, an automatic bias controller 206, a horizontal photodetector 210a, and a vertical photodetector 210b.

Although FIG. 2 illustrates one embodiment of an optical transmitter, an optical transmitter can be implemented in a wide variety of ways. For example, the optical transmitter 200 of FIG. 2 can include more or fewer components and/or a different arrangement of components. In one embodiment, the optical transmitter 114 of the optical transceiver module 108 can be implemented using the optical transmitter 200 depicted in FIG. 2.

The horizontal and vertical I/Q optical modulating devices 204 and 205 can be used to convert electrical I/Q signals into optical signals with orthogonal optical polarizations (for example, horizontal (H) and vertical (V) polarizations). In the illustrated embodiment, the horizontal and vertical I/Q optical modulating devices 204 and 205 each include a phase shifter and a pair of Mach-Zehnder modulators to convert electrical signals into I and Q optical signals or light waves. For example, the horizontal I/Q optical modulating device 204 includes a first optical modulator 204a, a second optical modulator 204b, and a phase shifter 208a. Additionally, the vertical I/Q optical modulating device 205 includes a first optical modulator 205a, a second optical modulator 205b, and a phase shifter 208b.

The optical transmitter 200 receives an input light beam along an input path 201a, and generates a modulated optical signal along an output path 201b. In one example, the input light beam corresponds to a light output from the Tx iTLA 112 of FIG. 1, and the modulated optical signal corresponds to the Tx optical signal 130 of FIG. 1. The input path 201a and the output path 201b can be implemented in a variety of ways, such as by using an optical waveguide and/or an optical fiber.

The optical splitter 202a splits the input light beam into a first component that is provided as an input to the horizontal I/Q optical modulating device 204 and a second component that is provided as an input to the vertical I/Q optical modulating device 205. In the illustrated embodiment, the optical splitter 202a includes a polarization beam splitter (PBS) that can split the input light beam into a first component having horizontal (H) polarization (for example, TM polarization) and a second component having a vertical (V) polarization (for example, TE polarization). Although illustrated as a polarization beam splitter, the optical splitter 202a can be implemented in a wide variety of ways, such as by using waveguide and/or fiber-based optical components that split the optical power of the input light beam equally or unequally.

The first and the second components of the input light beam are coupled into input optical waveguides 215a and 217a of the horizontal and vertical I/Q optical modulating devices 204 and 205, respectively. An optical splitter 203a further divides the first component of the input light between the optical modulators 204a and 204b of the horizontal I/Q optical modulating device 204, and an optical splitter 203c divides the second component of the input light between the optical modulators 205a and 205b of the vertical I/Q optical modulating device 205.

Light inputted into optical modulators 204a, 204b, 205a, and 205b is modulated with the electrical signals HI, HQ, VI and VQ, respectively. The light output of the optical modulators 204b, 205b is shifted using the phase shifters 208a, 208b, respectively. Additionally, the light outputs of the optical modulator 204a and the phase shifter 208a are combined using the optical coupler 203b and provided to an output waveguide 215b. Furthermore, the light outputs of the optical modulator 205a and the phase shifter 208b are combined using the optical coupler 203d and provided to an output waveguide 217b.

The optical splitters 203a and 203c and the optical couplers 203b and 203d can be implemented in a wide variety of ways, and can include directional couplers, multimode interference couplers and/or other optical components. As shown in FIG. 2, modulated light propagating along the output optical waveguides 215b and 217b is combined by an optical coupler 202b to generate the modulated optical signal on the output path 201b. In the illustrated embodiment, the optical coupler 202b includes a polarization beam combiner. However, the optical coupler 202b can be implemented in other ways, such as using optical waveguide and/or fiber-based components suitable for combining light beams.

The optical modulators 204a, 204b, 205a and 205b can be implemented in a wide variety of ways. In one example, the optical modulators 204a, 204b, 205a and 205b are Mach-Zehnder modulators implemented on a substrate including an electro-optic material such as, for example, lithium niobate ($LiNbO_3$) or indium phosphide (InP). For example, each of the Mach-Zehnder modulators can include an input waveguide that is split into a first branch and a second branch that extend along a length of the substrate and that are coupled together to form an output waveguide.

The illustrated optical transmitter 200 includes the automatic bias controller 206, which generates bias voltages for biasing the horizontal and vertical I/Q optical modulating devices 204 and 205. For example, with respect to the horizontal I/Q optical modulating device 204, the automatic bias controller 206 generates a first bias voltage (BIAS HI) for biasing the first optical modulator 204a, a second bias voltage (BIAS HQ) for biasing the second optical modulator 204b, and a third bias voltage (BIAS HPD) for biasing the phase shifter 208a. Additionally, with respect to the vertical I/Q optical modulating device 205, the automatic bias controller 206 generates a first bias voltage (BIAS VI) for biasing the first optical modulator 205a, a second bias voltage (BIAS VQ) for biasing the second optical modulator 205b, and a third bias voltage (BIAS VPD) for biasing the phase shifter 208b.

Although illustrated as part of the optical transmitter 200, in certain implementations the automatic bias controller 206 is separate from the optical transmitter 200. The automatic bias controller 206 can be implemented in a wide variety of ways, and can include one or more data converters, amplifiers, detectors, filters, microprocessors, microcontrollers, digital signal processors (DSPs), field programmable gate arrays (FPGAs), memories, and/or other electronic circuitry.

The automatic bias controller 206 controls the bias voltages of the horizontal I/Q optical modulating device 204 based on feedback received via the horizontal photodetector 210a. In one example, the automatic bias controller 206 controls a voltage level of the first bias voltage (BIAS HI) to control an offset of a horizontal I component of the modulated optical signal, controls a voltage level of the second bias voltage (BIAS HQ) to control an offset of a horizontal Q component of the modulated optical signal, and controls a voltage level of the third bias voltage (BIAS HPD) to control a phase difference between the horizontal I component and the horizontal Q component of the modulated optical signal to about 90 degrees. Similarly, the automatic bias controller 206 controls the bias voltages of the vertical I/Q optical modulating device 205 based on feedback received via the vertical photodetector 210b.

The bias voltages or points of the horizontal and vertical I/Q optical modulating devices 204 and 205 can change due to a wide variety of reasons, such as temperature changes, aging, and/or by dithering and/or a searching algorithm of the automatic bias controller 206. In the illustrated embodiment, the automatic bias controller 206 receives feedback via the horizontal and vertical photodetectors 210a, 210b. However, other implementations of feedback can be used.

In one embodiment, the automatic bias controller 206 applies a low frequency dither signal to one or more of the bias points of the horizontal I/Q optical modulating device 204 and/or the vertical I/Q optical modulating device 205. Additionally, the impact of the dithering can be observed via the horizontal and/or vertical photodetectors 210a and 210b. Thus, the automatic bias controller 206 can analyze and track the drifting of the biases by observing the impact of dithering. However, the automatic bias controller 206 can employ other tracking algorithms.

Example Transceiver Architecture

Figure 3A:
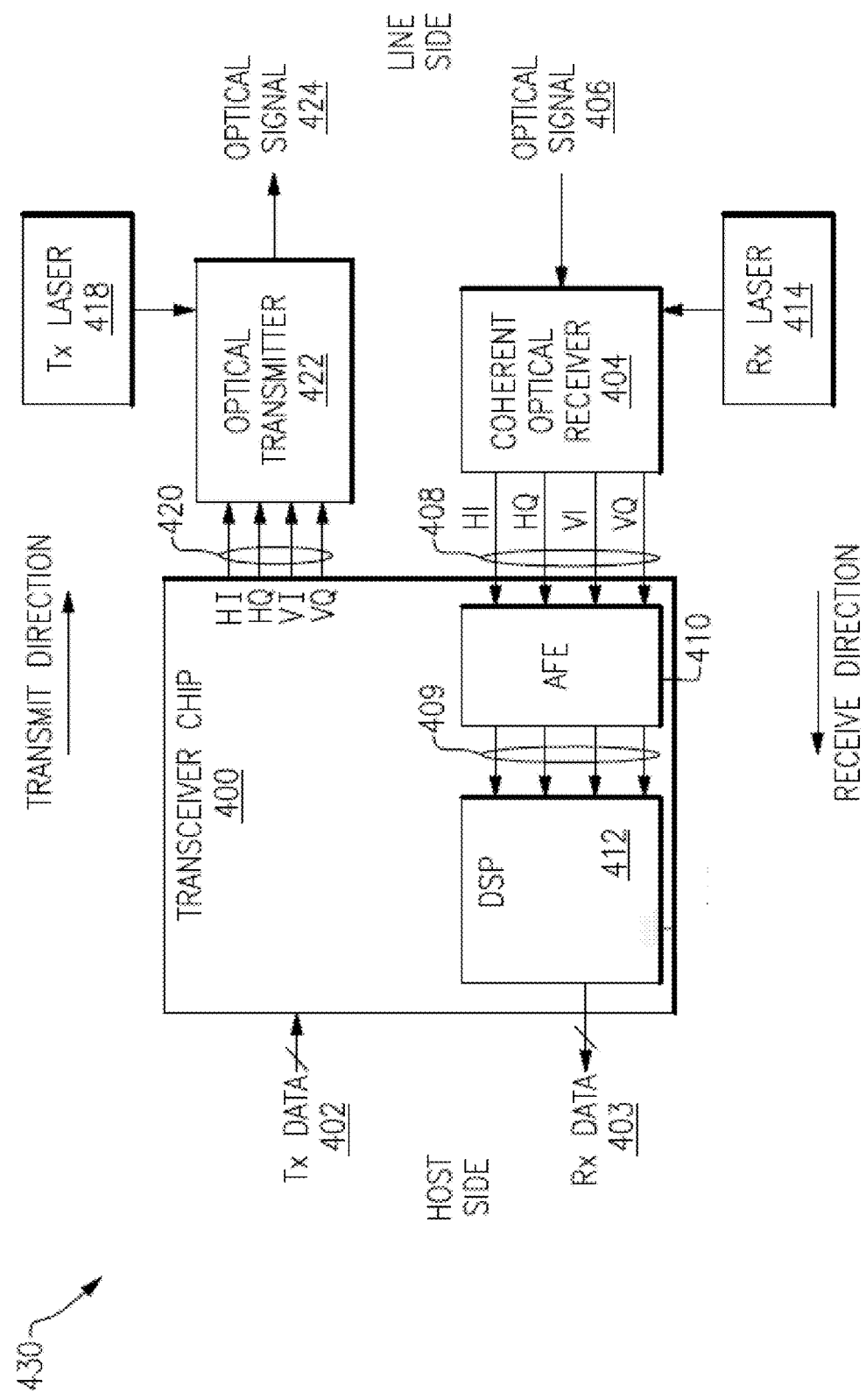
FIG. 3A is a schematic diagram of an optical transceiver system including a transceiver chip according to one embodiment.

FIG. 3A is a schematic diagram of an optical transceiver system 430 according to one embodiment. The optical transceiver system 430 includes a transceiver chip or integrated circuit (IC) 400, a coherent optical receiver 404, an optical transmitter 422, a receive laser 414, and a transmit laser 418.

Although FIG. 3A illustrates one embodiment of an optical transceiver system, an optical transceiver system can be implemented in a wide variety of ways. For example, the optical transceiver system 430 of FIG. 3A can include more or fewer components and/or a different arrangement of components. As another example, the coherent optical receiver and the Rx Lase 414 of FIG. 3A can be replaced by a direct-detection optical receiver in some embodiments.

As shown in FIG. 3A, the coherent optical receiver 404 generates an analog receive signal vector 408 based on a received optical signal 406 from an optical cable on a line side. The transceiver chip 400 processes the analog receive signal vector 408 to generate receive data 403 for a host device on a host side. As shown in FIG. 3A, the coherent optical receiver 404 receives a local oscillator signal from the receive laser 414, which can be, for example, a continuous wave (CW) laser or integrated tunable laser assembly. The transceiver chip 400 also processes transmit data 402 received form the host side to generate an analog transmit signal vector 420 for the optical transmitter 422. The optical transmitter 422 modulates the analog transmit signal vector 420 using an optical carrier signal from the transmit laser 418 to generate an optical transmit signal 424. Additional details can be similar to those described earlier.

The illustrated transceiver chip 400 includes an analog front-end 410 and a digital processing circuit 412. In the illustrated embodiment, the analog front-end 410 receives the analog receive signal vector 408, which includes HI, HQ, VI, VQ signals in this example. Additionally, the analog front-end 410 processes the analog receive signal vector 408 to generate a digital receive signal vector 409 that is provided to the digital processing circuit 412.

The digital signal processing circuit 412 can provide a wide variety of processing to the digital receive signal vector 409, including, for example, skew correction, filtering, clock recovery, decoding, I and Q amplitude imbalance correction, I and Q phase imbalance correction, compensation for phase noise of the optical carrier, chromatic dispersion compensation, and/or intersymbol interference (ISI) correction.

Additional details of the optical transceiver system 430 of FIG. 3A can be similar to those described earlier.

Figure 3B:
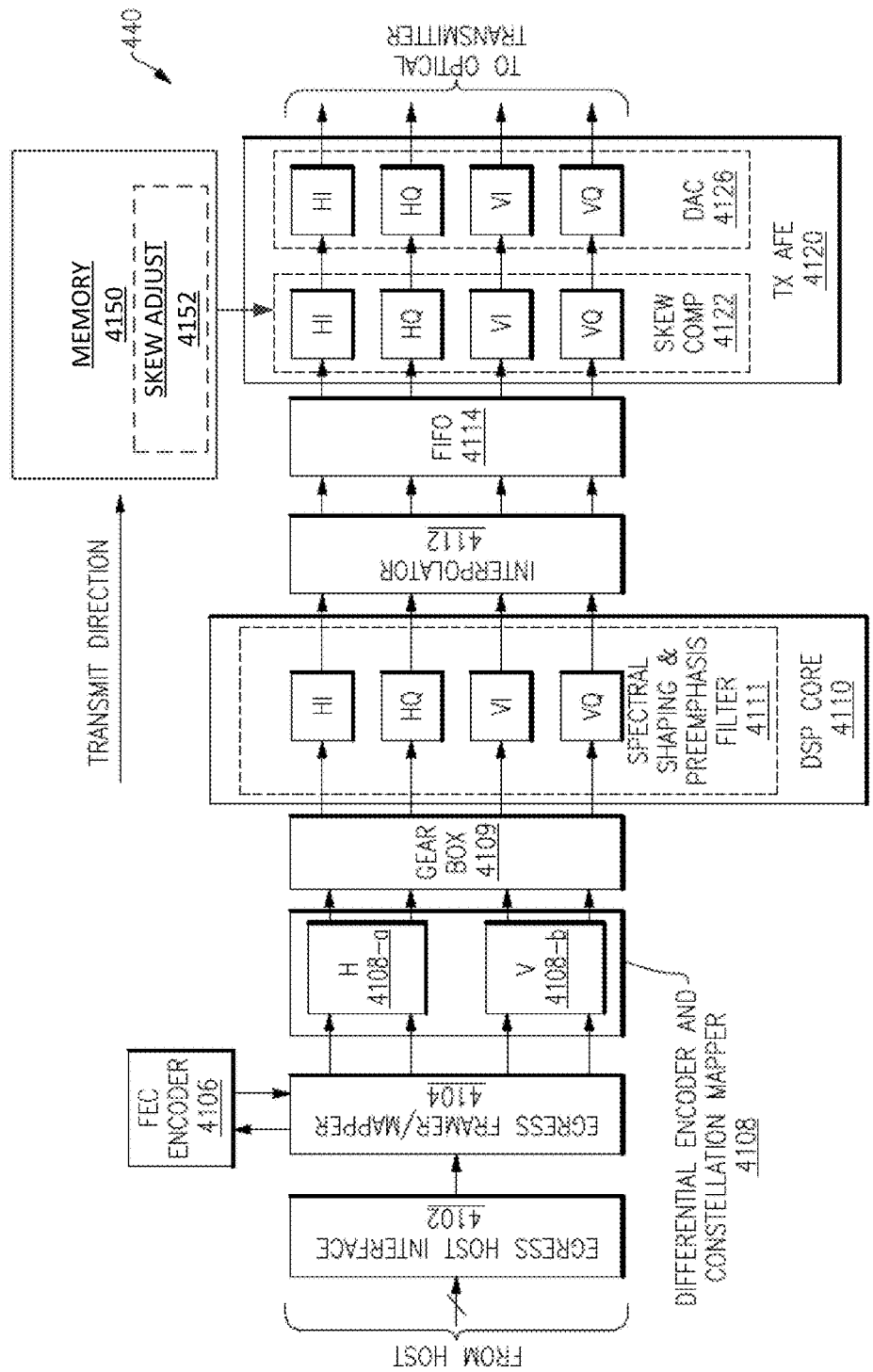
FIG. 3B is a schematic diagram of one embodiment of a transmit path architecture for the transceiver chip of FIG. 3A.

FIG. 3B is a schematic diagram of one embodiment of a transmit path architecture 440 for the transceiver chip 400 of FIG. 3A. The transmit path architecture 440 receives data from a host device and processes the data to generate an analog transmit signal vector for an optical transmitter.

The illustrated transmit path architecture 440 includes an egress host interface 4102, an egress framer/mapper 4104, a forward error correction (FEC) encoder 4106, a differential encoder and constellation mapper 4108, a gear box 4109, a digital signal processing core 4110, an interpolator 4112, a FIFO 4114, a transmit analog front-end (AFE) 4120, and a programmable memory 4150. As shown in FIG. 3B, the differential encoder and constellation mapper 4108 includes a horizontal encoder and constellation mapper 4108-*a* and a vertical encoder and constellation mapper 4108-*b*. Additionally, the digital signal processing core 4110 includes a spectral shaping and preemphasis filter 4111, and the transmit AFE 4120 includes a skew compensation block 4122 and a digital-to-analog converter (DAC) block 4126.

The egress host interface 4102 processes received data signals from a host device. In certain implementations, the egress host interface 4102 also includes a host demultiplexer configured to recover clock signals from, and demultiplex, the received data signals. The egress host interface 4102 may also perform various processing functions such as, for example, equalization, signal integrity monitoring, and/or skew compensation. The egress framer/mapper 4104 is configured to receive data from the egress host interface 4102 and perform framing/mapping of the data according to a programmable framing/mapping protocol. The FEC encoder 4106 can add error correction bytes according to a forward error correction scheme suitable for a particular optical network. In this example, the differential encoder and constellation mapper 4108 receives four input signal data streams (for example, HI, HQ, VI, and VQ) and generates output signals using dual-polarization (DP) differential or non-differential modulation formats, including, for example, PSK, BPSK, QPSK, 16QAM, and/or QAM of other indices or levels. In certain implementations, processing is performed on a per-polarization basis (for example, separately for each of the horizontal and vertical polarizations using encoders/mappers 4108-*a* and 4108-*b*, respectively), or using an encoding/mapping procedure that mixes polarizations.

The gear box 4109 can receive the signal stream from the differential encoder and constellation mapper 4108 at a net data rate corresponding to a nominal data rate and reformat the data in the signal stream to a new data rate to accommodate any modifications to FEC code words. Additionally, the gear box 4109 generates an output signal stream including data at the nominal data rate (for example, at the same data rate as that of the input stream to the gear box 4109). Accordingly, the gear box 4109 is operable to change the parallelization factor of the egress path. In the illustrated embodiment, the digital signal processing core 4110 includes a spectral shaping and preemphasis filter for each lane HI, HQ, VI and VQ. The spectral shaping and preemphasis filter 4111 can be designed to have a frequency response that pre-compensates for, or pre-equalizes, frequency-dependent attenuation of the electrical path between the DAC and the optical transmitter. The interpolator 4112 interpolates the data signal from the digital signal processing core 4110 to convert between sampling rates to enable different components of the egress path architecture to operate at different sampling rates.

The FIFO 4114 includes a data storage buffer that stores and queues blocks of data received in parallel from the interpolator 4112. The FIFO 4114 feeds the data to the transmit AFE 4120.

The transmit AFE 4120 includes the skew compensation filter 4122, which compensates the data for skew introduced by the optical transmitter and the electrical signal path associated with the signal lanes of the DAC block 4126. The DAC block 4126 receives the skew-compensated data, and generates analog signals (HI, HQ, VI, VQ) for transmission to the optical transmitter.

In the illustrated embodiment, the programmable memory 4150 includes skew adjustment data 4152 that controls an amount of skew adjustment provided by the skew compensation filter 4122. In one embodiment, the skew compensation filter 4122 includes multi-tap filters that are controlled by the skew adjustment data 4152. The programmable memory 4150 can be on-chip or off-chip.

As described herein, a coherent receiver can be used to observe a power of a timing tone of an optical signal. The observations of power of the timing tone are correlated to transmitter skew. Accordingly, a transmitter can transmit an optical signal for each of multiple skew adjustment values, and a value of skew adjustment corresponding to about the highest tone power and/or about the lowest side tone power can be selected. Additionally, the transmitter can be programmed with data corresponding to the selected skew adjustment value, such that the transmitter operates with the selected skew adjustment value during operation. In the illustrated embodiment, the skew adjustment data 4152 is programmed into the programmable memory 4150, such that the analog transmit signal vector has reduced or eliminated skew.

Accordingly, a coherent receiver can observe power of the timing tone for each of multiple values of transmitter skew adjustment to determine an appropriate amount of skew adjustment to apply to the transmitter. After the calibration cycle, a transmitter is programmed to operate with the selected amount of skew adjustment, such that the transmitter operates with reduced or eliminated transmit skew.

Although one specific implementation of skew adjustment is shown, a transmitter skew can be adjusted in a wide variety of ways.

In certain implementations, the programmable memory 4150 can be a non-volatile memory, including, for example, a flash memory, a read-only memory (ROM), a memory implemented using fuses and/or anti-fuses, and/or a magnetic storage device. However, other configurations are possible, such as implementations in which the programmable memory 4150 is a volatile memory that is programmed to include data corresponding to the selected skew adjustment value during power-up or turn-on.

The transmit path architecture 440 of FIG. 3B illustrates one example of transmit path circuitry suitable for a transceiver chip. However, a transceiver chip can include transmit path architectures implemented in a wide variety of ways.

Figure 3C:
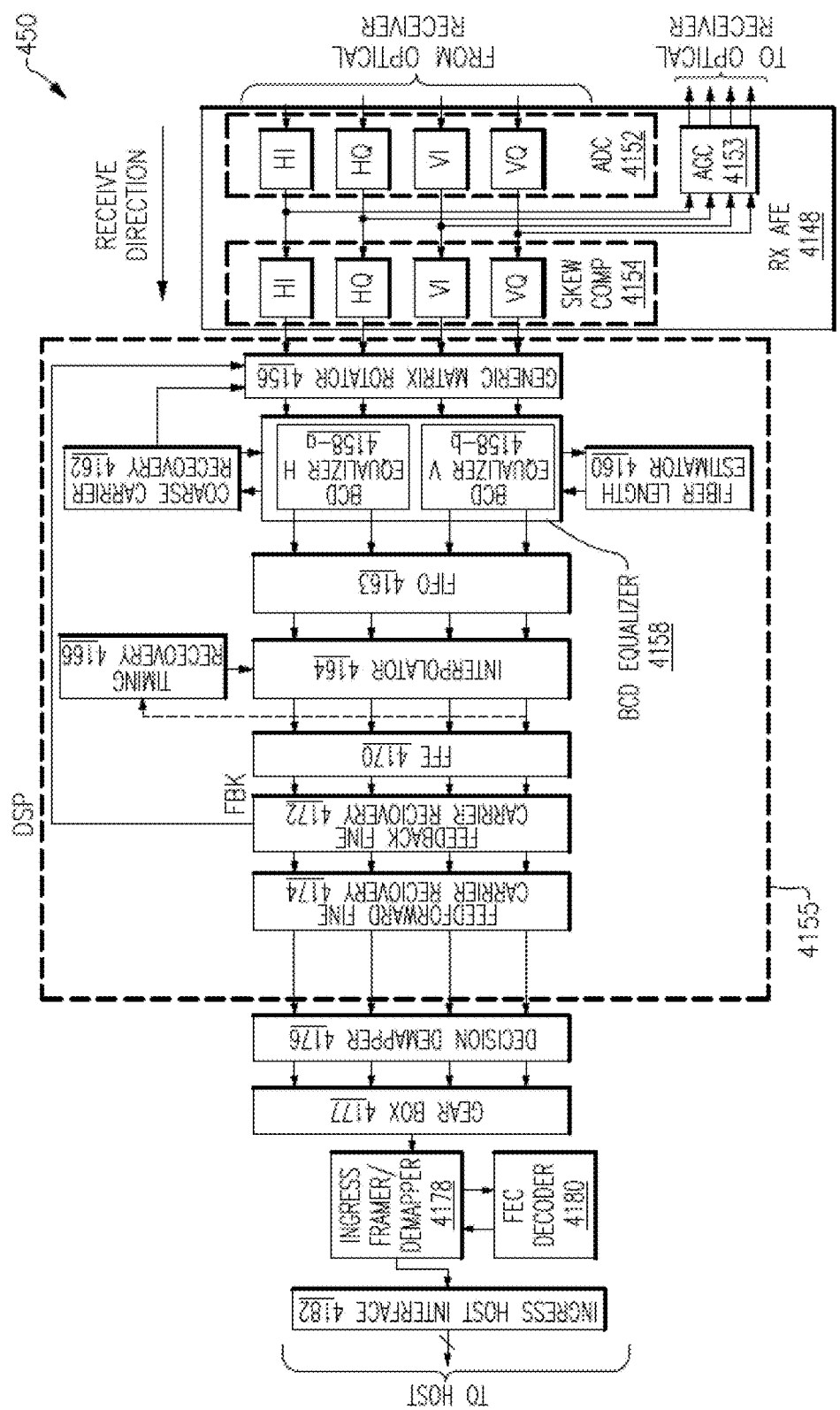
FIG. 3C is a schematic diagram of one embodiment of a receive path architecture for the transceiver chip of FIG. 3A.

FIG. 3C is a schematic diagram of one embodiment of a receive path architecture 450 for the transceiver chip of FIG. 3A. The receive path architecture 450 receives an analog receive signal vector from an optical receiver and processes the data to generate transmit data for a host device.

The illustrated receive path architecture 450 includes a receive analog front-end (AFE) 4148, a digital signal processing circuit 4155, a decision demapper or slicer 4176, a gear box 4177, an ingress framer/demapper 4178, a FEC decoder 4180, and an ingress host interface 4182.

The illustrated receive AFE 4148 includes an analog-to-digital converter (ADC) block 4152 that converts the analog receive signal vector to a digital signal vector, which is processed by skew compensation filters 4154 to compensate for differences in signal delays in the receive path as a result of receiver-side skew. The ADC block 4152 can be programmable to operate with different resolutions and/or different programmable data rates (for example, 32 GSa/s for DP-16QAM, 64 GSa/s for DP-QPSK, at 128 Gb/s line rate). In certain implementations, the receive AFE 4148 can include a line demultiplexer configured to parallelize the data for processing by the digital signal processing circuit 4155. In the illustrated embodiment, the receive AFE 4148 also includes an automatic gain control circuit 4153 that detects the amplitude of the received analog signals and provides feedback to the optical receiver to control gain.

The illustrated digital signal processing circuit 4155 includes a generic matrix rotator 4156, a bulk chromatic dispersion (BCD) equalizer 4158, a fiber length estimator 4160, a coarse carrier recovery block 4162, a FIFO 4163, an interpolator 4164, a timing recovery block 4166, a feedforward equalizer (FFE) 4170, a feedback fine carrier recovery block 4172, and a feedforward fine carrier recovery block 4174.

The generic matrix rotator 4156 applies a matrix transformation to the digital signal vector to compensate for impairments associated with optical demodulation in the optical receiver. Additionally, the BCD equalizer 4158 includes a horizontal compensator/equalizer 4158-a and a vertical compensator/equalizer 4158-b, which operate to compensate for chromatic dispersion in the optical channel. Furthermore, the fiber length estimator 4160 can estimate the extent or amount of chromatic dispersion introduced by the optical channel to select a mode of operation of the BCD equalizer 4158, and the coarse carrier recovery block 4162 performs an initial frequency acquisition or carrier recovery of the received signal during a start-up phase.

The FIFO 4163 operates as a data storage buffer that stores and queues blocks of data samples received from the BCD equalizer 4158. The interpolator 4164 processes data from the FIFO 4163 to correct for I/Q imbalances, such as skew between I and Q components and/or a difference in amplitude between I and Q components. The interpolator 4164 can perform sampling rate conversion to interface between the digital signal processing circuit 4155 and the receive AFE 4148 without loss of data samples. The timing recovery block 4166 estimates the frequency and phase of the received data signal and generates timing information used to recover the data. The FFE 4170 filters the data and applies equalization to compensate for intersymbol interference (ISI) effects imposed by the optical and electrical channels. The feedback fine carrier recovery block 4172 and the feedforward fine carrier recovery block 4174 further refine the carrier recovery performed by the coarse carrier recovery block 4162. As shown in FIG. 3C, the feedback fine carrier recovery block 4172 provides a feedback signal FBK to the generic matrix rotator 4156.

The decision demapper or slicer 4176 operates to decode information from the feedforward fine carrier recovery block 4174. The decision demapper or slicer 4176 can provide a variety of information, such as the most probable decoded bits based on the transformed constellation data. The gear box 4177 can change a parallelization factor of the data from the decision demapper 4176. The ingress framer/demapper 4178 performs framing and demapping of data so as to transform modulation symbols to source bits. The FEC decoder 4180 can be used to add error correction using a forward error correct scheme. The ingress host interface 4182 is used to provide data to a host device using a desired protocol. In certain implementations, the ingress host interface 4182 includes a host multiplexer for multiplexing data provided to the host device.

The receive path architecture 450 of FIG. 3C illustrates one example of receive circuitry suitable for a transceiver chip. However, a transceiver chip can include receive path architectures implemented in a wide variety of ways.

Effect of Skew on Power of a Timing Tone

The modulated optical signals s(t) received along the receiver path can be represented by the corresponding I and Q components as $s(t)=(s_I(t)+js_Q(t))e^{j\omega t}$. The modulated optical signals can be detected using a direct-detection optical receiver (e.g., direct-detection optical receiver 604 depicted in FIG. 6A-2) or a coherent receiver (e.g., coherent receiver 404 depicted in FIG. 3A or FIG. 6A-1).

When a direct-detection optical receiver is used to detect the modulated optical signal, the output of the direct-detection optical receiver can be directed towards a scope which can provides the variation of the square of the magnitude of the optical signal, $|s(t)|^2$ as a function of time and/or a RF spectrometer which provides the absolute value of the Fourier Transform of the square of the magnitude of the optical signal, $|F\{|s(t)|^2\}|$.

Figures 1, 4A:
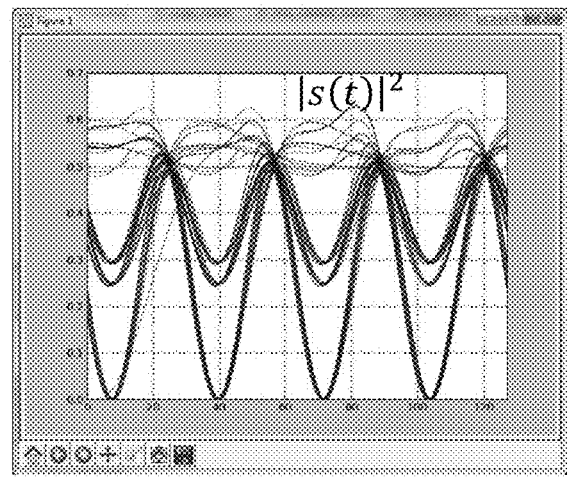
Figures 2, 4A:
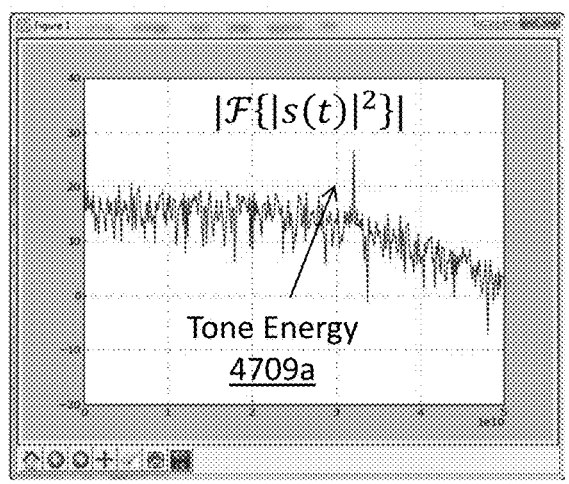

FIG. 4A-1 shows a simulated oscilloscope output of an example of a 32 GBaud QPSK modulated optical signal s(t) detected using a direct-detection optical receiver when the amount of skew between I and Q components is very small, such as, for example 0.

FIG. 4A-2 illustrates the Fourier Transform of the square of the magnitude of the optical signal. FIG. 4A-2 shows a peak 4709a at the Baud frequency which corresponds to the timing tone.

Figures 1, 4B:
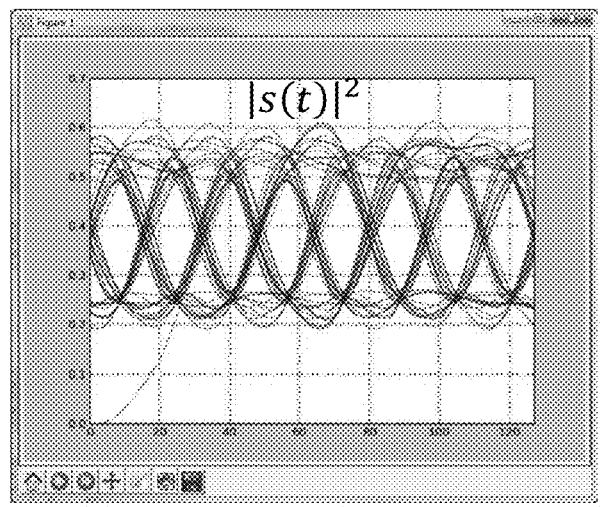
Figures 2, 4B:
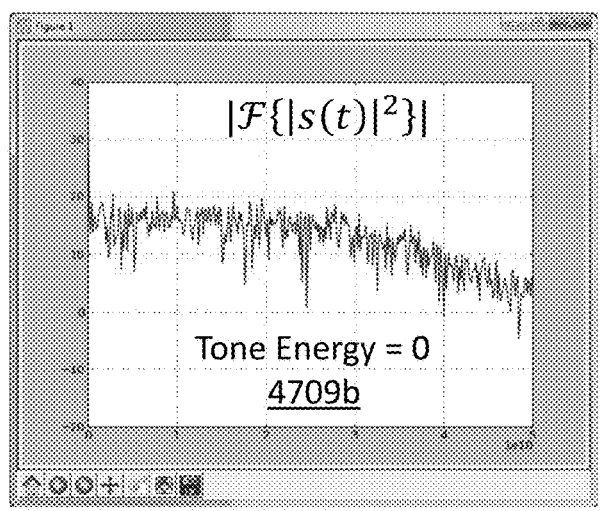

FIG. 4B-1 shows a simulated oscilloscope output of an example of a 32 GBaud QPSK modulated optical signal s(t) detected using a direct-detection optical receiver when the amount of skew between I and Q components is 0.5 Baud.

FIG. 4B-2 illustrates the Fourier Transform of the square of the magnitude of the optical signal. FIG. 4B-2 shows the absence of a peak 4709b at the Baud frequency which corresponds to the timing tone. In general, the skew can also be correlated with the Fourier Transform of the square of the optical signal. However, it may not be possible to calculate or obtain Fourier Transform of the square of the optical signal with many embodiments of direct-detection optical receiver.

Embodiments of coherent optical receiver (e.g., coherent receiver 404 depicted in FIG. 3A or FIG. 6A-1) can be used to obtain and/or calculate power of a timing tone which corresponds to the absolute value of the Fourier Transform of the square of the magnitude of the optical signal, $|F\{|s(t)|^2\}|$ and the power of a side tone which corresponds to the absolute value of the Fourier Transform of the square of the magnitude of the optical signal, $|F\{s(t)^2\}|$.

Figures 1, 5A:
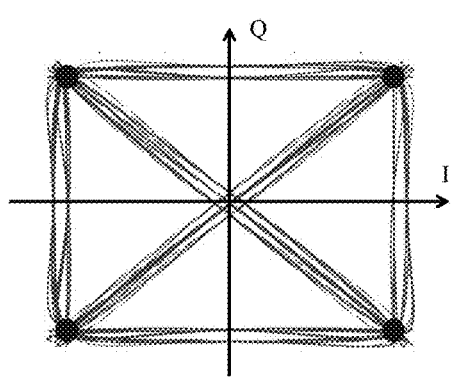

When a coherent optical receiver is used to detect the modulated optical signal, the power of a timing tone can be calculated using the mathematical expression $|s(t)|^2=(s_I(t)+js_Q(t))^*(s_I(t)-js_Q(t))$. FIG. 5A-1 illustrates the simulated complex constellation for the optical signal s(t) detected using a coherent receiver when the amount of skew between I and Q components is very small. FIG. 5A-2 illustrates the simulated complex constellation for the timing tone represented by $|s(t)|^2$ for the signal s(t) illustrated in FIG. 5A-1. FIG. 5A-3 illustrates the simulated complex constellation for the side tone represented by $s(t)^2$ for the signal s(t) illustrated in FIG. 5A-1.

Figures 1, 5B:
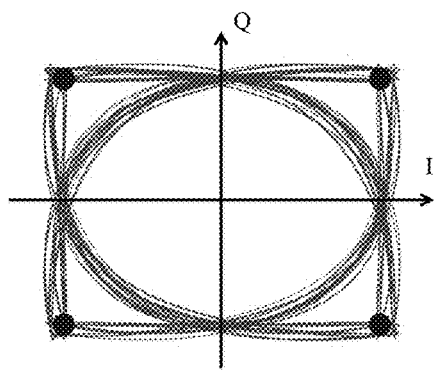
Figures 2, 5A:
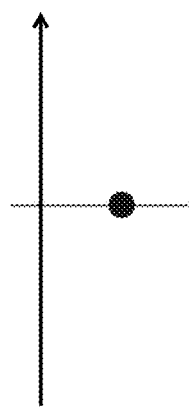
Figures 2, 5B:
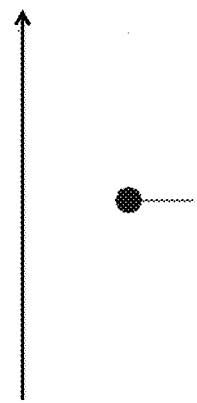
Figures 3, 5A:
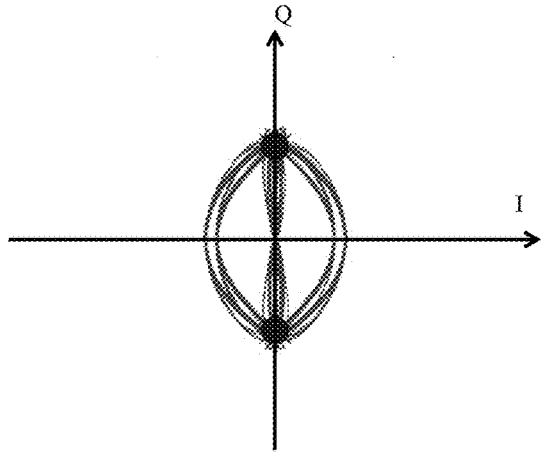
Figures 3, 5B:
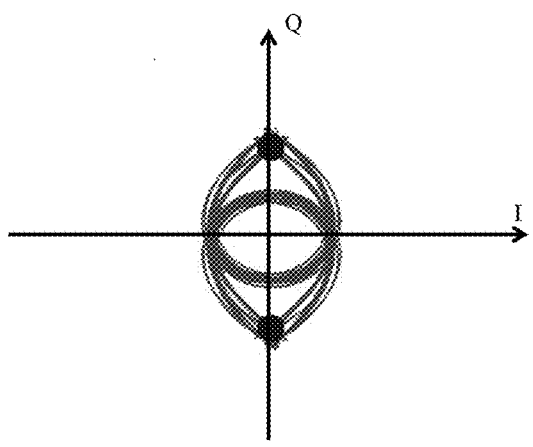

FIG. 5B-1 illustrates the simulated complex constellation for the signal s(t) using a coherent receiver when the amount of skew between I and Q components is 0.5 Baud. FIG. 5B-2 illustrates the simulated complex constellation for the timing tone represented by $|s(t)|^2$ for the signal s(t) illustrated in FIG. 5B-1. FIG. 5B-3 illustrates the simulated complex constellation for the side tone represented by $s(t)^2$ for the signal s(t) illustrated in FIG. 5B-1.

Figure 5C:
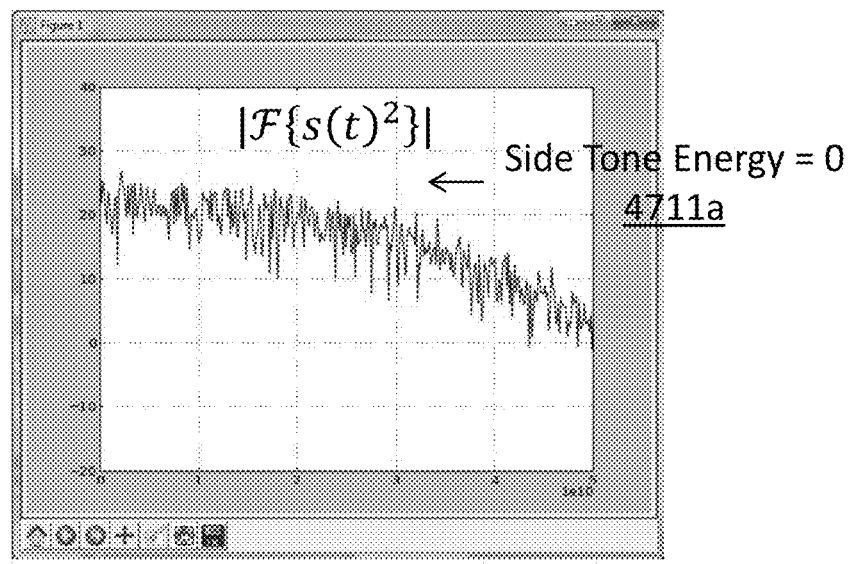
FIG. 5C illustrates a Fast Fourier Transform of the square of a simulated modulated optical signal recovered by a coherent receiver, the I and the Q components of the modulated optical signal being aligned such that the skew between the I and the Q components is approximately 0.
Figure 5D:
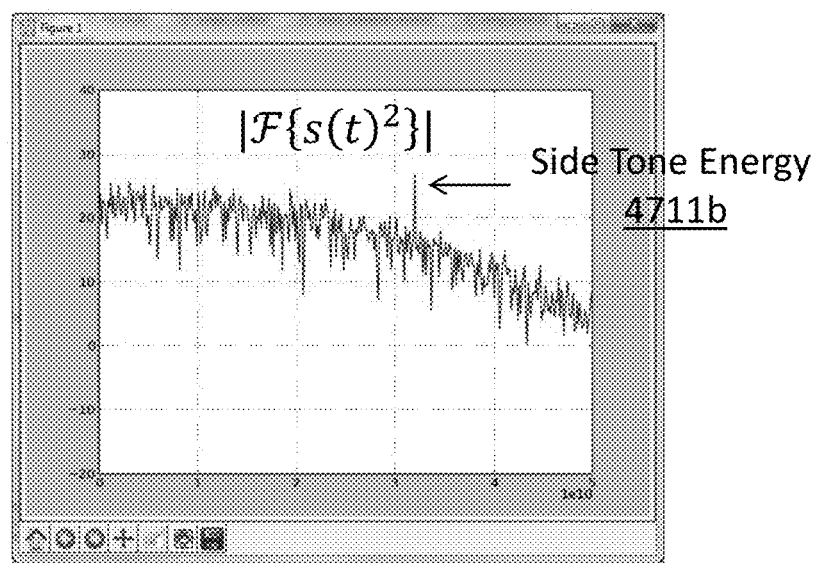
FIG. 5D illustrates a Fast Fourier Transform of the square of a simulated modulated optical signal recovered by a coherent receiver, the I and the Q components of the modulated optical signal being aligned such that the skew between the I and the Q components is approximately 0.5 Baud.

FIG. 5C illustrates a Fast Fourier Transform of the square of a simulated modulated optical signal recovered by a coherent receiver, the I and the Q components of the modulated optical signal being aligned such that the skew between the I and the Q components is approximately 0. FIG. 5D illustrates a Fast Fourier Transform of the square of a simulated modulated optical signal recovered by a coherent receiver, the I and the Q components of the modulated optical signal being aligned such that the skew between the I and the Q components is approximately 0.5 Baud.

For a QPSK modulated signal, I and Q can each have values 1 or −1. When the I and Q components are substantially aligned (or when the skew between I and Q components is 0.0 UI), the signal transitions through 0 as the values of I and Q change between 1 or −1, as shown in FIG. 5A-1 resulting in an increase in the power of the timing tone $|s|^2$ and an absence of a side tone corresponding to FFT of $s(t)^2$ as depicted in FIG. 5C.

For a QPSK modulated signal, when the I and Q components are misaligned (for instance, when the skew between I and Q components is 0.5 UI), the signal does not transition through 0 as the values of I and Q change between 1 or −1, as shown in FIG. 5B-1 resulting in a decrease in the power of the timing tone $|s|^2$ and a presence of a side tone corresponding to FFT of $s(t)^2$ as depicted in FIG. 5D.

The analog front-end in the receiver path of various embodiments of transceivers (e.g., AFE 410, RX AFE 4148) generates a digital representation of analog I and Q signals recovered by an optical receiver (e.g., coherent optical receiver 404). The I and the Q components for each of horizontal and vertical polarizations can be digitally represented as i[n] and q[n], where n denotes the number of samples. The signals recovered by the optical receiver (e.g., coherent optical receiver 404) after processing by the analog front-end in the receiver path of various embodiments of transceivers (e.g., AFE 410, RX AFE 4148) can thus be represented as a complex signal s[n]=i[n]+j*q[n], where j is the square root of (−1).

The analog front-end in the receiver path of various embodiments of transceivers herein can be configured to obtain and/or calculate a power of a timing tone of the optical signal, including a tone power of the timing tone and/or a side tone power of the timing tone. The tone power of the timing tone of the optical signal can be determined by a value of the square of the absolute value of the complex signal, or $|s|^2$, at a frequency about equal to the Baud rate. The side tone power of the timing tone of the optical signal can be determined by a value of the absolute value of the square of the complex signal, or $s^2$, near a frequency about equal to the Baud rate.

Accordingly, when the I and the Q components for one or both the horizontal and vertical polarizations is substantially aligned, the tone power of the timing tone for the corresponding polarization is maximum and the side tone power of the timing tone is minimum. In this manner, the alignment or skew between the I and the Q components for one or both the horizontal and vertical polarizations can be obtained by calculating the tone power and/or the side tone power of the timing tone.

Figures 1, 6A:
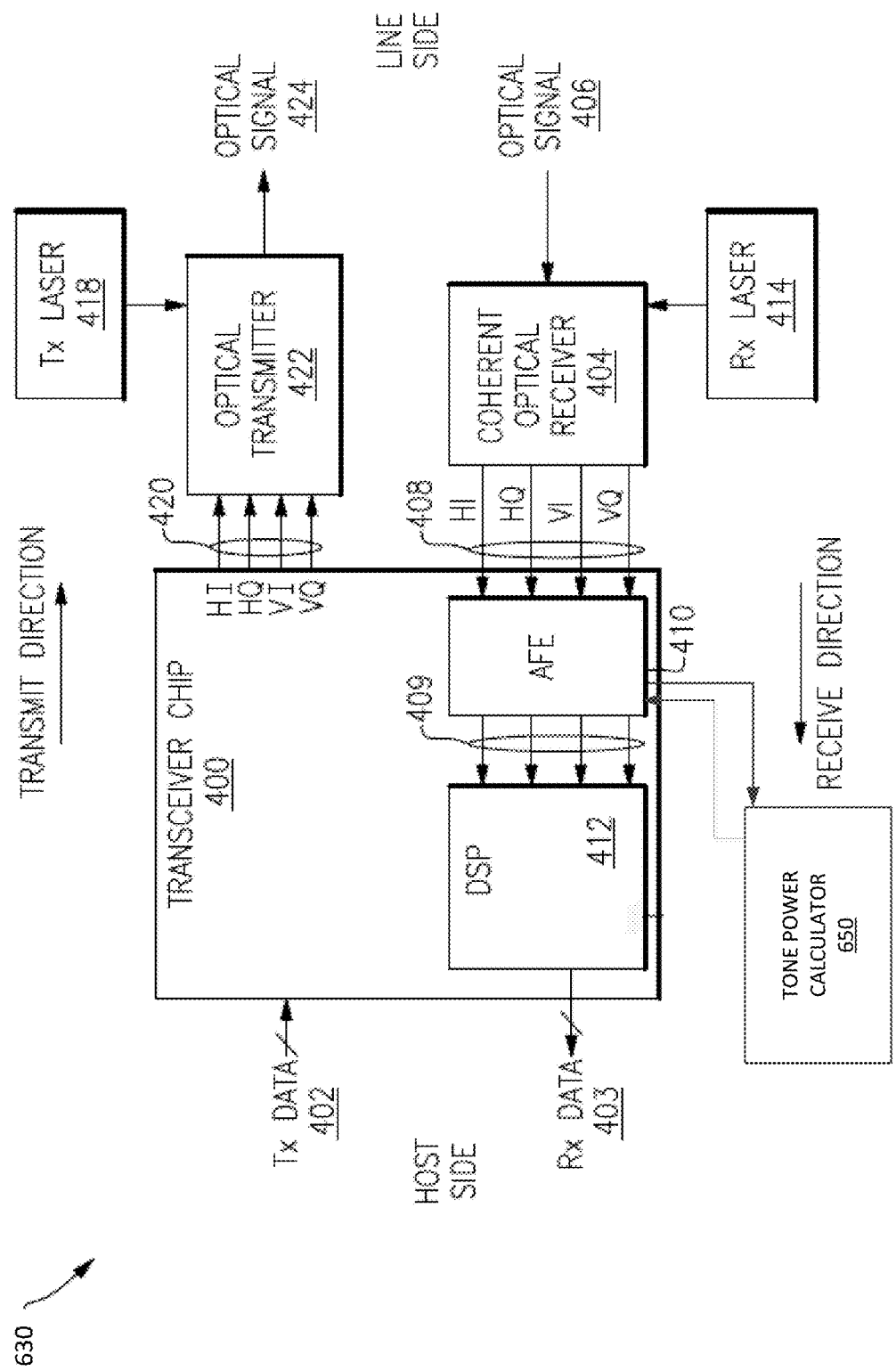
Figures 2, 6A:
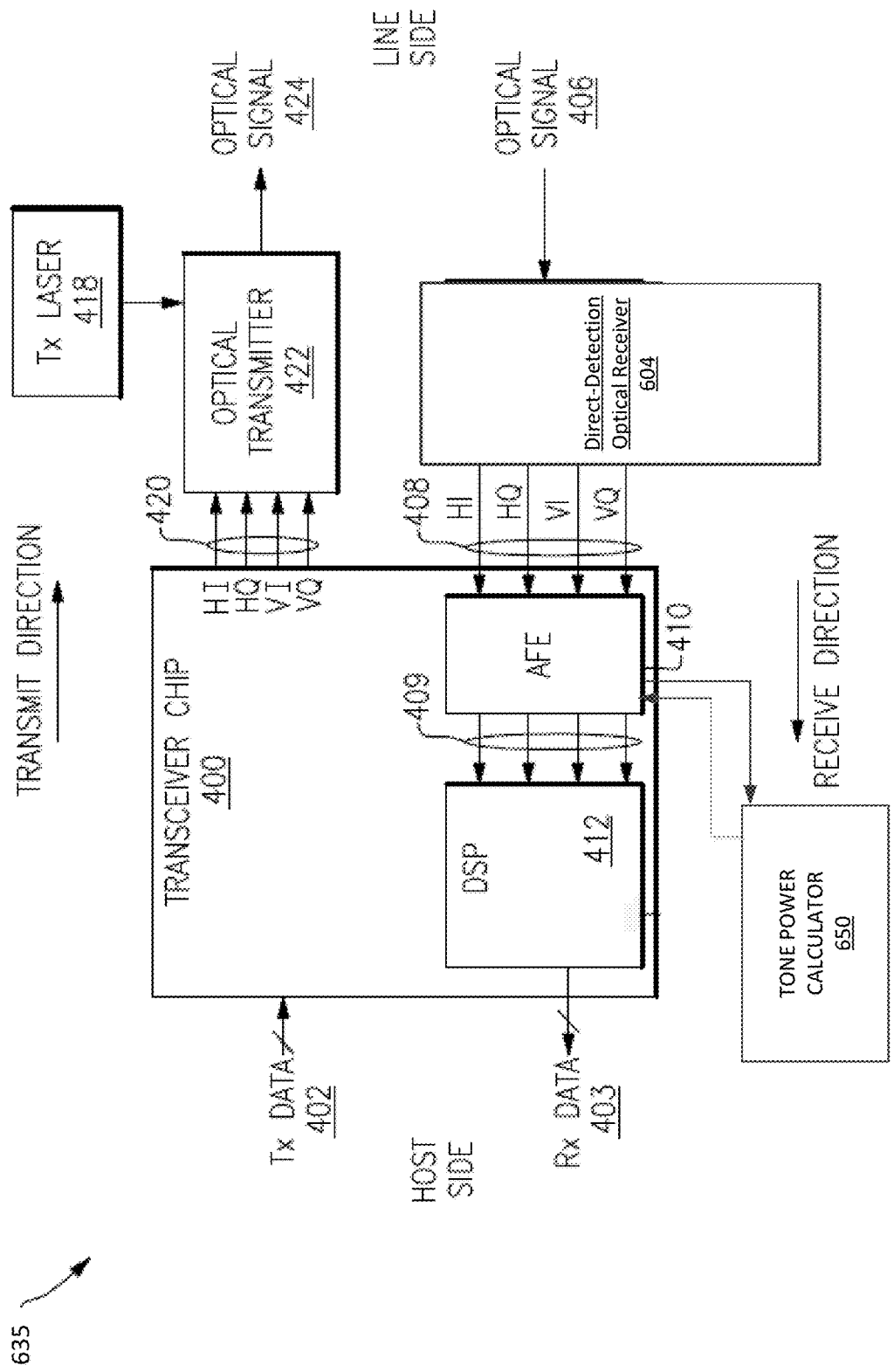

FIG. 6A-1 is a schematic diagram of an optical transceiver system 630 including a tone power calculation module or tone power calculator (TPC) 650. The optical transceiver system 630 of FIG. 6A-1 is similar to the optical transceiver system 330 of FIG. 3A and includes a coherent receiver. The optical transceiver system 630 of FIG. 6A-1 further includes the tone power calculator 650. FIG. 6A-2 is a schematic diagram of another embodiment of an optical transceiver system including a direct-detection optical receiver and a tone power calculator.

Figure 6B:
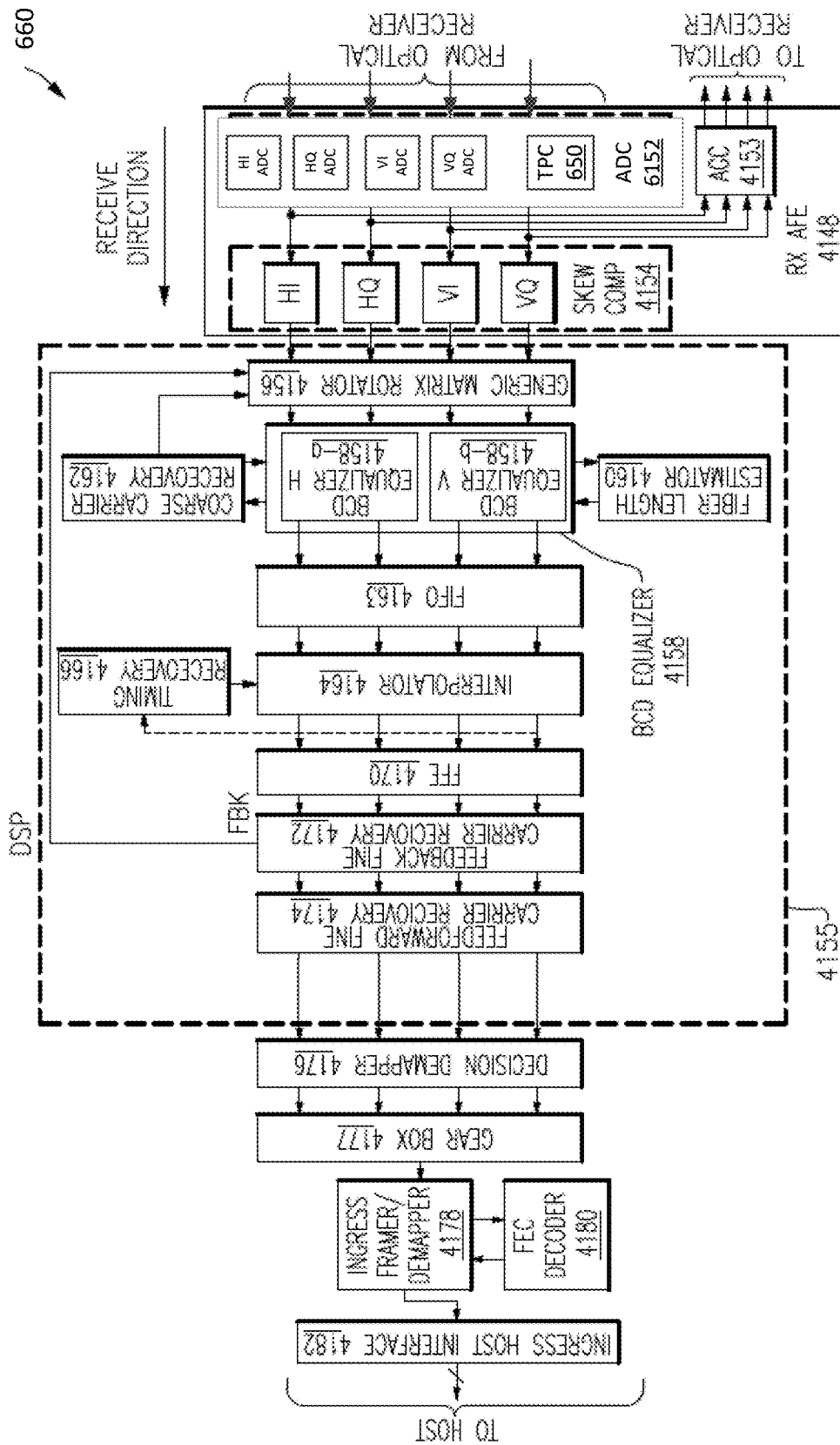
FIG. 6B is a schematic diagram of one embodiment of a receive path architecture including a tone power calculator.

FIG. 6B is a schematic diagram of one embodiment of a receive path architecture 660 including a tone power calculator 650. The receive path architecture 660 of FIG. 6B is similar to the receive path architecture 450 of FIG. 3C, except that the receive path architecture 660 of FIG. 6B further includes the tone power calculator 650.

With reference to FIGS. 6A-1, 6A-2 and 6B, the tone power calculator 650 can be implemented as an external component that is not integrated with the transceiver chip 400 as depicted in FIGS. 6A-1 and 6A-2 or integrated in a receive path architecture 660 of a transceiver chip as depicted in FIG. 6B.

The tone power calculator 650 calculates a power of the timing tone based on processing a signal vector representing an optical signal.

In one embodiment, for a particular polarization (for instance, horizontal or vertical), the ADC block 6152 generates complex signal data s[n] represented as i[n]+j*q[n], where i[n] is a digital representation of an I signal component, q[n] is a digital representation of a Q signal component, n is the number of samples, and j is the square root of (−1). Additionally, the tone power calculator 650 processes the complex signal data to calculate at least one of a tone power of the timing tone or a side tone power of the timing tone.

In one embodiment, the TPC 650 calculates a tone power of the timing tone based on a value of $|s|^2$ at a frequency about equal to the Baud rate, for instance, within about 500 MHz of the baud rate. In another embodiment, the TPC 650 calculates a side tone power of the timing tone based on a value of $|s^2|$ near a frequency about equal to the Baud rate, for instance, within about 500 MHz of the baud rate.

In various embodiments, a variety of different methods can be used to calculate a power of a timing tone of an optical signal. For example, the power of the timing tone and/or the side tones can be calculated by digitally processing (for instance, via a transform, such as an FFT) of a digital signal vector representing an optical signal and/or by analog processing of an analog signal vector representing the optical signal. Thus, the tone power calculator 650 can be configured to calculate the power of the timing tone of the signals recovered by the optical receiver in the analog domain (for example, at the input of the AFE 410 or ADC 6152) or in the digital domain (for example, at the input of the AFE 410 or ADC 6152). It is noted that while timing tone can be calculated or obtained using digital and/or analog processing with commercial devices (including commercially obtained oscilloscope and RF spectrum analyzer), a power of a side tone can only be calculated/obtained with a coherent optical receiver and digital processors.

Although, the power of the tone power of the timing tone at the Baud rate and/or the side tone power near the Baud rate can be used herein to estimate skew, the power of the timing tone can be calculated at other frequencies. For example, in one embodiment, a power of the timing tone at a harmonic and/or sub-harmonic frequency is calculated.

The AFE 410 or the RX AFE 4148 including the TPC 650 can be used to provide skew adjustment to a transmitter or transceiver, including, but not limited to, the transceiver chip 110 of FIG. 1, the transceiver chip 400 of FIG. 3A, the transceiver chip 400 of FIG. 6A, and/or the TX AFE 4120 of FIG. 3B.

For example, a transmitter can be calibrated during a calibration cycle to reduce or eliminate skew between I and Q components of a transmit signal. The calibration cycle can occur, for instance, after manufacturing and prior to operation by an end-user in an optical network.

For example, the TPC 650 can calculate a power of a timing tone of an optical signal. The calculations of the power of the timing tone are correlated to transmitter skew. Accordingly, a transmitter can transmit an optical signal for each of multiple skew adjustment values, and a value of skew adjustment corresponding to about the highest tone power and/or about the lowest side tone power can be selected. Additionally, the transmitter can be programmed with data corresponding to the selected skew adjustment value, such that the transmitter operates with the selected skew adjustment value during operation. For example, a programmable memory, such as a non-volatile memory, can be programmed with data corresponding to the selected skew adjustment value.

In one embodiment, the TPC 650 calculates the power of the timing tone, and the amount of skew correction is iteratively adjusted. For example, a transmitter skew adjustment value between I and Q components of a transmit signal can be selected, with a step size dt. Additionally, the step size dt can be changed and another iteration of calculation of the power of the timing tone can be performed. Using iteration can reduce calibration time. In certain configurations, the TPC 650 iteratively adjust the skew between the I and the Q components at the output of the transmitter until the tone power of the timing tone is substantially maximized and/or the side tone power of the timing tone is substantially minimized.

However, other implementations are possible, including, but not limited to, implementations where the power the timing tone is calculated for all skew adjustment values or a subset of skew adjustment values.

Providing skew calibration of transmitter by calculating tone power at a receiver provides a number of benefits. For example, a transmitter can be calibrated for skew without relying on expensive scopes or analyzers, such as, for example, an optimal modulation analyzer.

Example Methods of Aligning Skew Based on Timing Tone

Figure 7A:
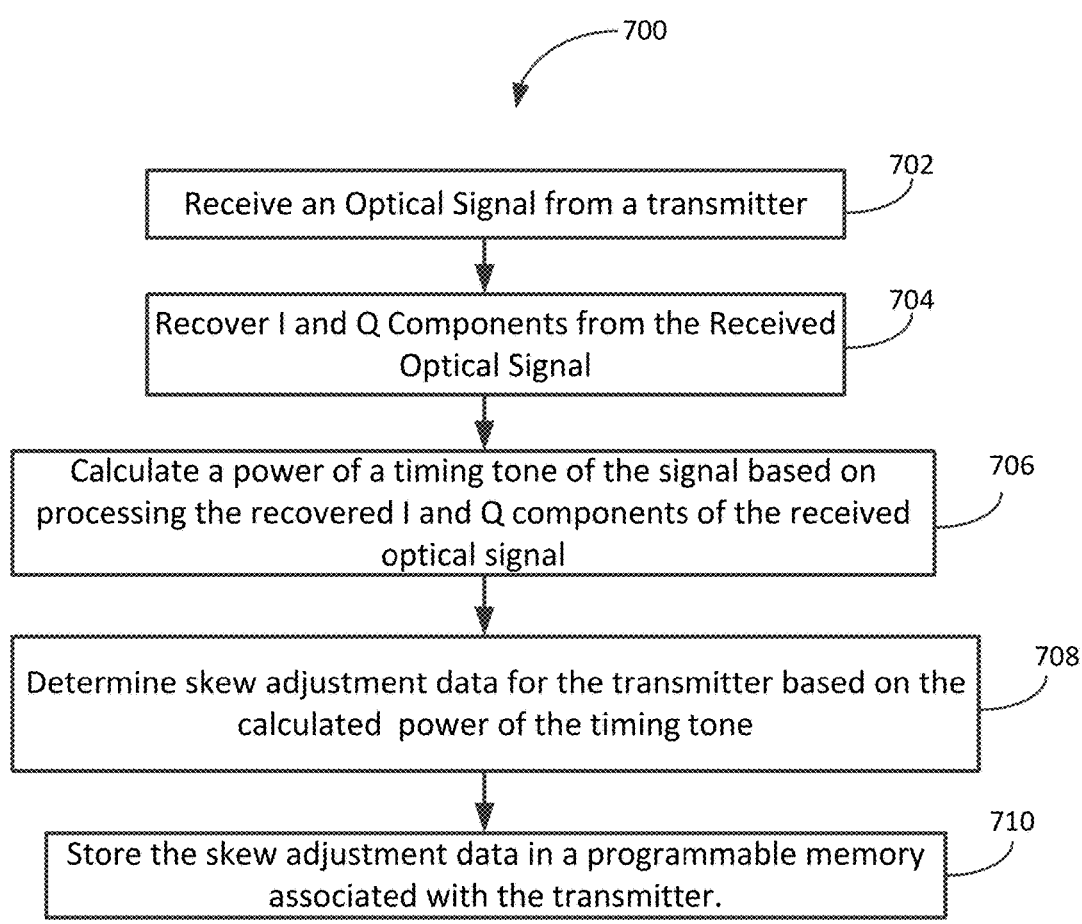
FIG. 7A is a flowchart of a method of skew alignment according to one embodiment.

FIG. 7A is a flowchart of a method 700 of skew alignment according to one embodiment. The method 700 can be performed using the transceivers and optical transceiver modules described herein.

The method 700 includes receiving an optical signal from a transmitter as depicted in block 702. As shown in block 704, the method 700 further includes recovering I and Q components from the received signal. The method 700 continues at block 706, in which a power of a timing tone of the optical signal is calculated based on processing the recovered I and Q components of the received optical signal. The calculated power can include, for example, tone power of the timing tone and/or side tone power of the timing tone. In a block 708, skew adjustment data is determined for the transmitter based on the calculated power of the timing tone. The method 700 continues at block 710, in which the skew adjustment data is stored in a programmable memory associated with the transmitter.

Figure 7B:
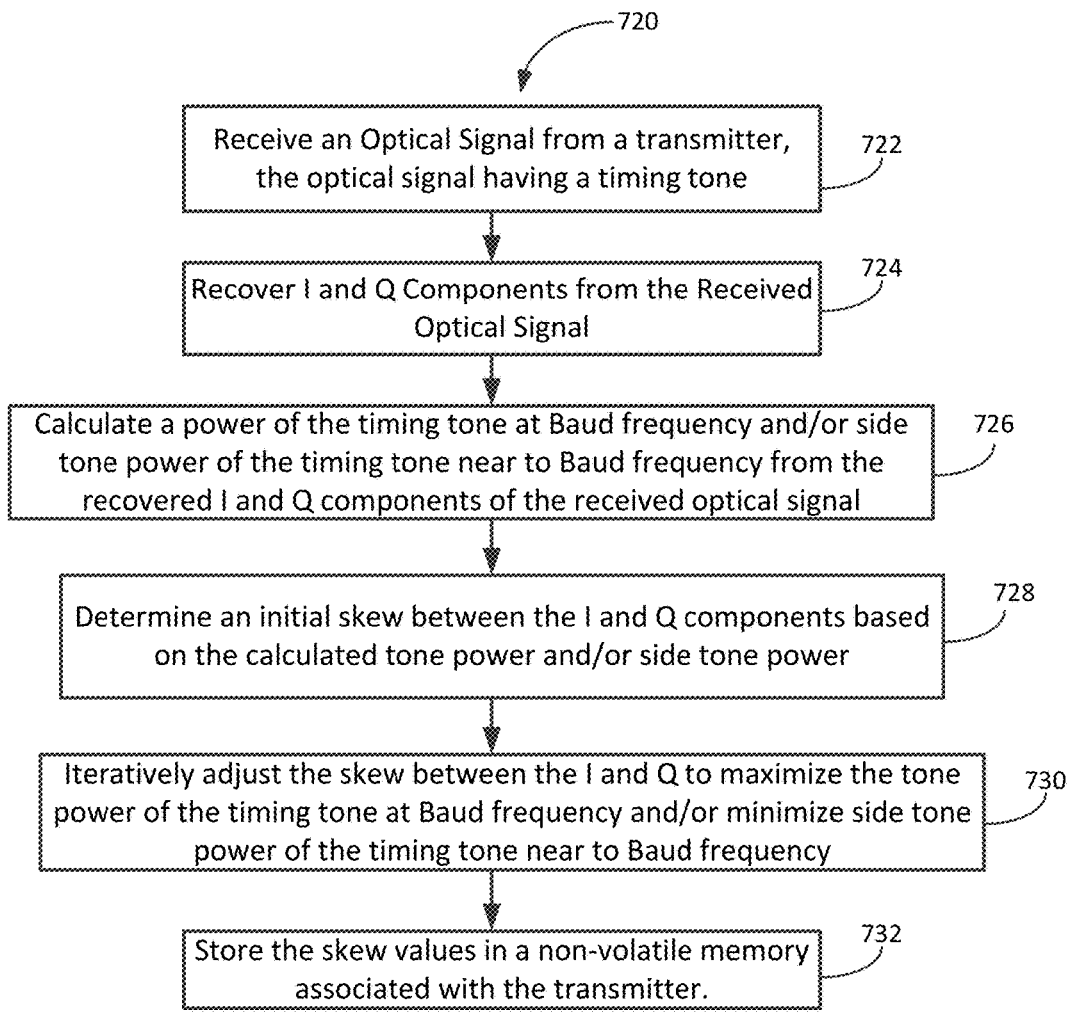
FIG. 7B is a flowchart of a method of skew alignment according to another embodiment.

FIG. 7B is a flowchart of a method 720 of skew alignment according to another embodiment.

The method 720 includes receiving an optical signal from a transmitter as depicted in block 722. The optical signal has a timing tone corresponding to a baud rate of the optical signal. The optical signal can be similar to the received optical signal 132 discussed above with reference to FIG. 1 and/or the received optical signal 406 discussed above with reference to FIG. 3A. The optical signal can be received by a coherent receiver (for example, coherent receiver 120 and/or coherent receiver 404).

As shown in block 724, I and Q components are recovered from the received optical signal. Tone power of the timing tone at the Baud frequency and/or side tone power of the timing tone near to the Baud frequency of the recovered I and Q components of the received optical signal are calculated as shown in block 726. The tone power of the timing tone at the Baud frequency and the side tone power close to the Baud frequency can be calculated using a tone power calculator. The calculation can be performed in the analog domain (e.g., at the input of the AFE 410 or ADC 6152) and/or in the digital domain (e.g., at the input of the AFE 410 or ADC 6152).

A value for an initial skew is determined based on the calculated tone power and/or side tone power of the timing tone at the Baud frequency and/or power of the side tone close to the Baud frequency, as shown in block 728. The initial skew value can be determined using one of the following metrics (or criteria)—c1: power of the timing tone at the Baud frequency for both horizontal and vertical polarizations; c2: power of the timing tone at the Baud frequency for horizontal polarization; c3: power of the timing tone at the Baud frequency for vertical polarization; c4: power of the side tone close to the Baud frequency for both horizontal and vertical polarizations; c5: a weighted subtraction of c1 and c4 in which c1 has a higher weight than c4; c6: a weighted combination of c1 and c4 in which c1 has a higher weight than c4; c7: a weighted combination of c2 and c3 in which the weight (m1) for c2 and is determined from the equation—$m1=(max(c2)-min(c2))/((max(c2)-min(c2))+(max(c3)-min(c3)))$ and the weight (m2) for c3 is determined from the equation—$m2=(max(c3)-min(c3))/((max(c2)-min(c2))+(max(c3)-min(c3)))$; and c8: a weighted combination of c2 and c3 in which the weight (m1) for c2 and is determined from the equation—$m1=sum(c2)$ and the weight (m2) for c3 is determined from the equation—$m2=sum(c3)$.

In one embodiment, a tone power calculator, such as the tone power calculator 650 of FIGS. 6A and 6B, detects power of a tone signal using one or more of the above metrics.

The skew between the I and the Q components in the transmitter path (e.g., at the output of the TX AFE 4120, the output of the transceiver chip 400, or the output of the transceiver chip 110) can be adjusted based on the determined initial skew value. After the transmitter skew is adjusted based on the initial skew value, the tone power of the timing tone at the Baud frequency and side tone power of the timing tone close to the Baud frequency of the recovered I and Q components of the received optical signal are calculated again. The transmitter skew can be adjusted iteratively until the tone power of the timing tone at the Baud frequency is substantially maximized and/or side tone power of the timing tone close to the Baud frequency is substantially minimized as shown in block 730.

The step size by which the transmitter skew value is adjusted can be varied at each iteration. For example, the step size by which the transmitter skew value is adjusted can be large initially, when the tone power of the timing tone at the Baud frequency is far from the maximum value and/or side tone power of the timing tone close to the Baud frequency is far from the minimum value. The step size by which the transmitter skew value is adjusted can be reduced as the power of the timing tone at the Baud frequency approaches the maximum value and/or power of the side tone close to the Baud frequency approaches the minimum value. The skew values determined by the method 720 can be stored in a non-volatile memory of the transceiver chip 400, as shown in step 732.

Example Optical Communication Systems Including a Tone Power Calculator

Figure 8A:
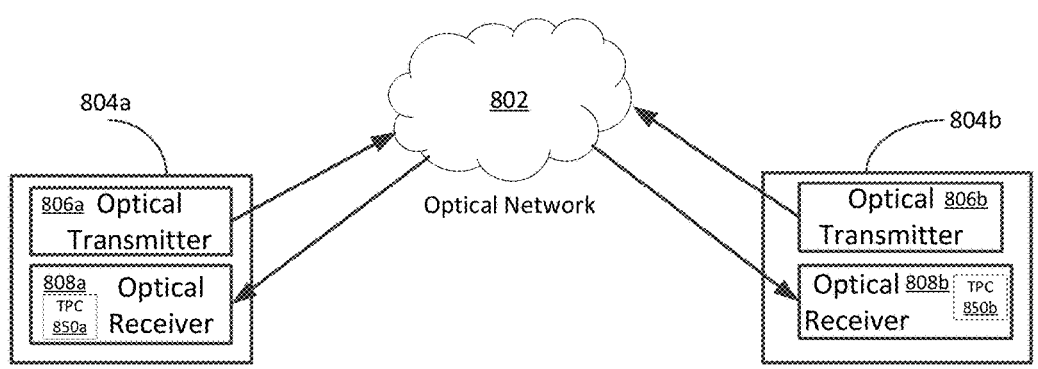
FIG. 8A is a schematic diagram of a first optical communication system in communication with another optical communication system via an optical network.
Figure 8B:
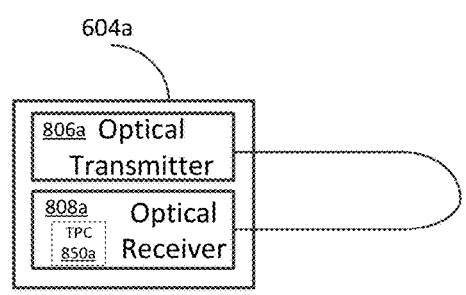
FIG. 8B is a schematic diagram of a transceiver including an optical transmitter and an optical receiver connected to one another via an optical link.

FIG. 8A is a schematic diagram of a first optical communication system in communication with another optical communication system via an optical network. FIG. 8B is a schematic diagram of an optical transmitter of a transceiver connected to an optical receiver of the optical transceiver via an optical link.

The optical communication system 804a includes an optical transmitter 806a, an optical receiver 808a and a tone power calculator 850a. The optical communication system 804b includes an optical transmitter 806b, an optical receiver 808b and a tone power calculator 850b.

The optical communication systems 804a and 804b can operate in a router, a server, a hub, a datacenter system, a network backhaul system, a computer, a phone system, or any other system that transmits and receives optical signals over the optical network 802. The optical network 802 can be a DWDM network, an OFDM network, a TDM network, etc. In various implementations, the optical communication systems 806a and 806b can include one or more components and functional blocks similar to one or more of the components and functional blocks of the transceiver architecture described above with reference to FIGS. 3A-3C.

In various embodiments, the optical receiver 808a or 808b can be pre-calibrated such that there is no skew as a result of delays in the I and Q signals paths in the corresponding receiver 808a or 808b while the optical transmitter 806a or 806b are uncalibrated. The optical receivers 808a or 808b can be calibrated using external instruments or by using a transmitter in which the I and the Q signals are perfectly aligned such that the skew between the I and the Q signal components is about 0. The uncalibrated optical transmitter 806a or 806b can be subsequently calibrated by approximately maximizing the tone power of the timing tone at the Baud frequency and/or approximately minimizing the side tone power of the timing tone close to the Baud frequency. For example, in the embodiment illustrated in FIG. 8A, the optical transmitter 806a can be calibrated using the TPC module 850b of the optical receiver 808b and/or the optical transmitter 806b can be calibrated using the TPC module 850a of the optical receiver 806b. As another example, in the embodiment illustrated in FIG. 8B, the optical transmitter 806a can be calibrated using the TPC module 850a of the optical receiver 806b.

Thus an optical transmitter can be calibrated during a calibration cycle to reduce or eliminate skew between I and Q components of an analog transmit signal vector. The calibration cycle can occur, for instance, after manufacturing and prior to operation by an end-user in an optical network. In certain implementations, the optical transmitter is optically connected to the optical receiver of the same optical transceiver module (for instance FIG. 8B), such that the optical transceiver module calibrates itself. In another example, one optical transceiver module is used to calibrate another optical transceiver module. For instance, as shown in FIG. 8A, a first optical transceiver module can be initially calibrated for skew, and thereafter used as a reference for calibrating another optical transceiver module.

Example Experimental Results Showing Effect of Skew on Tone Power

Figure 9:
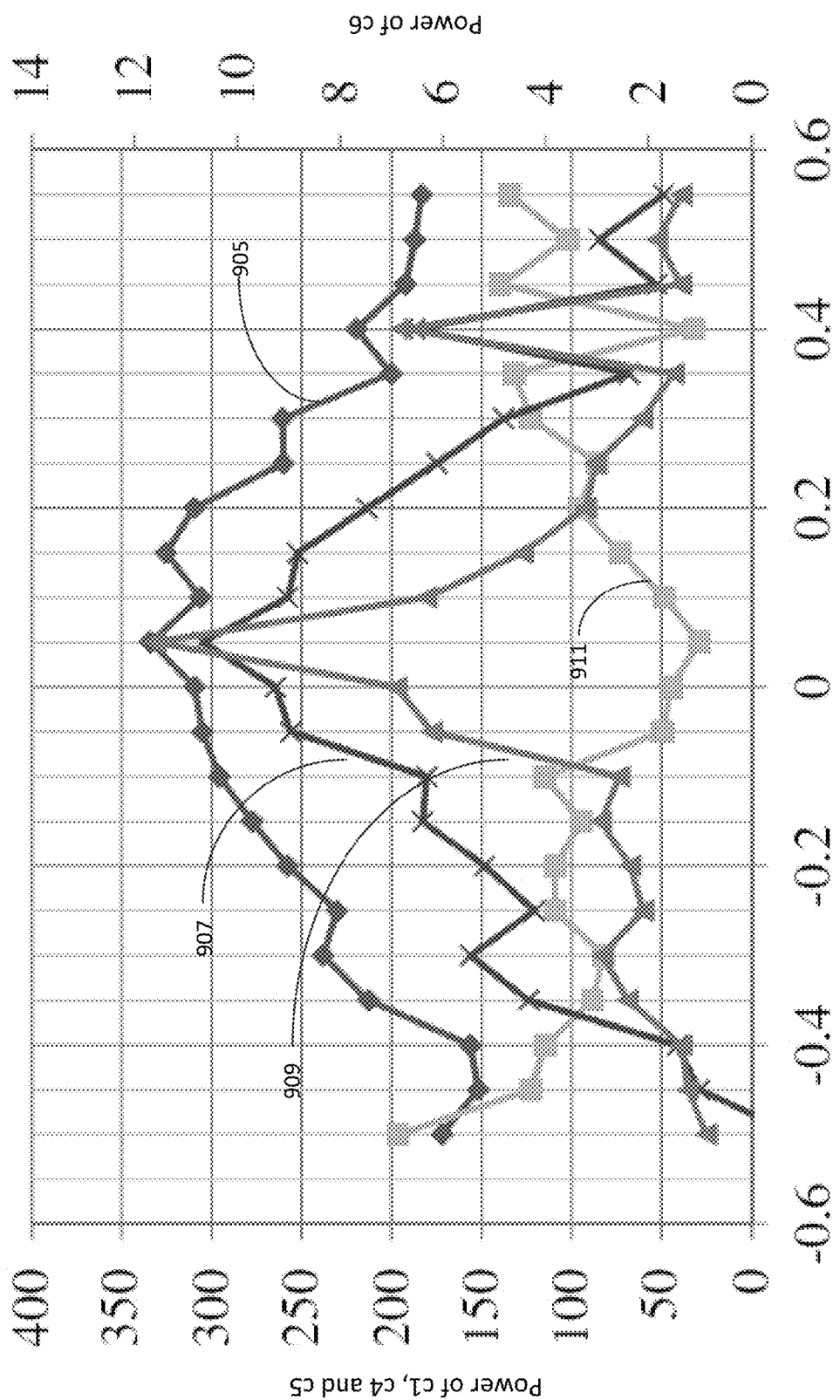
FIG. 9 shows the variation of the four metrics as the skew between the I and the Q signal components is varied.

FIG. 9 shows the variation of the four metrics c1, c4, c5 and c6 as the skew between the I and the Q signal components is varied. The data presented in FIG. 9 is obtained by sweeping the skew between the I and the Q signal components of the horizontal polarization between −0.6 UI and 0.6 UI. The skew between the I and the Q signal components of the vertical polarization is maintained at 0.

Curve 905 shows the variation of the metric c1 corresponding power of the timing tone at the Baud frequency for both horizontal and vertical polarizations with respect to the variation in the skew between the I and the Q signal components of the horizontal polarization. Curve 907 shows the variation of the metric c5 corresponding to a weighted subtraction of c1 and c4 in which c1 has a higher weight than c4 with respect to the variation in the skew between the I and the Q signal components of the horizontal polarization. Curve 909 shows the variation of the metric c6 corresponding to a weighted combination of c1 and c4 in which c1 has a higher weight than c4 with respect to the variation in the skew between the I and the Q signal components of the horizontal polarization. Curve 911 shows the variation of the metric c4 corresponding to power of the side tone close to the Baud frequency for both horizontal and vertical polarizations with respect to the variation in the skew between the I and the Q signal components of the horizontal polarization.

As discussed above, the power of the timing tone at the Baud frequency for both horizontal and vertical polarizations is maximum or close to maximum for small values of skew (e.g., in the range between −0.2 UI and 0.2 UI including a skew value of 0.0 UI) between the I and the Q signal components of the horizontal polarization while the power of the side tone close to the Baud frequency is minimum or close to maximum for small values of skew (e.g., in the range between −0.2 UI and 0.2 UI including a skew value of 0.0 UI) between the I and the Q signal components of the horizontal polarization. Accordingly, the metric c5 corresponding to weighted subtraction and the metric c6 corresponding to weighted combination also have peak values for small values of skew (e.g., in the range between −0.2 UI and 0.2 UI including a skew value of 0.0 UI) between the I and the Q signal components of the horizontal polarization.

Figure 10:
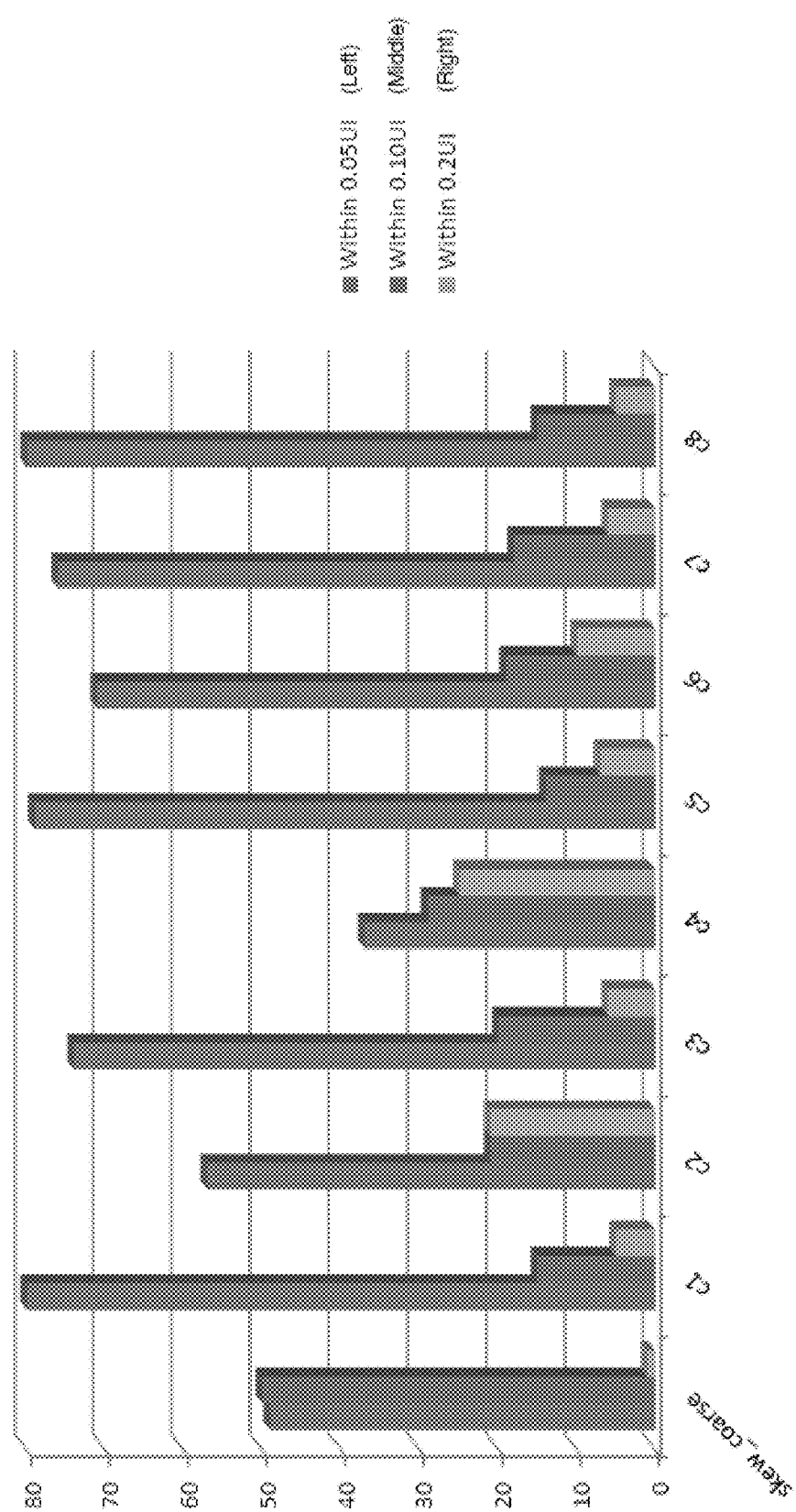
FIG. 10 illustrates the results of 100 trials in which the skew between I and Q components of a signal was optimized using coarse skew adjustment and by using a variety of metrics.

FIG. 10 illustrates the results of 100 trials in which the skew between I and Q components of a signal was optimized using coarse skew adjustment and by using metrics c1 through c8 discussed above. As noted from FIG. 10, 79% of estimations of skew between I and Q components of a signal using the metric c5 are within 0.05 UI while 80% of estimations of skew between I and Q components of a signal using the metrics c1 and c8 are within 0.05 UI. Accordingly, skew adjustments made by using metrics c1, c7 and c8 can lead to optimal results more frequently as compared to skew adjustments made by coarse skew adjustment or other metrics.

Equalizer Based Skew Compensation

An optical transmitter can include optical modulators for transmitting optical signals over the optical cable. In one example, an optical transmitter includes a first optical modulator for generating in-phase (I) optical signal and a second optical modulator for generating a quadrature-phase (Q) optical signal. The optical modulators can be controlled using electrical I and Q transmit signals representing the I and Q optical signals.

However, the presence of skew between the electrical I and Q transmit signals can degrade transmission errors and/or degrade the reliability of data transmission. The skew can arise from a variety of sources, including, but not limited to, mismatches in on-chip and/or board conducting lines or traces and/or phase errors in clocks signals used to control timing of transmitter circuits, such as DACs that generate the electrical I and Q transmit signals. Moreover, mismatches between optical modulators can also introduce skew. It is advantageous to detect and correct skew to improve the receiver performance and to increase the reliability of data transmission.

In certain implementations, the optical transmitter can also employ automatic bias control to bias the optical modulators to enhance the accuracy of transmissions. For example, an automatic bias controller can be used to control biasing of the optical modulators. For instance, the automatic bias controller can generate a first bias voltage that controls an offset of the first optical modulator, a second bias voltage that controls an offset of the second optical modulator, and a third bias voltage that controls a phase difference between the I and Q optical signals. Although automatic bias control can enhance the performance of communications over an optical cable, an automatic bias controller may not precisely control the bias voltages to the desired values. For example, the bias voltages can include small perturbations associated with dithering and/or the voltage levels of the bias voltages can drift due to a searching algorithm and/or a change in operating environment.

Accordingly, transmitter skew and/or errors in optical modulator bias voltages can lead to decoding errors at the optical receiver, such as burst errors and/or loss of frames. Sensitivity to errors in transmitter skew and/or modulator biasing can be exacerbated in applications using high-speeds and/or high-order modulation formats.

In certain configurations herein, a receiver is provided for processing an analog signal vector representing an optical signal received from a transmitter. The receiver includes an analog front-end that converts the analog signal vector into a digital signal vector including a digital representation of an I component and a Q component of the optical signal. The receiver further includes a digital signal processing circuit configured to process the digital signal vector to recover data, and the digital signal processing circuit includes a transmitter error compensation system that compensates the digital signal vector for at least one of a transmit skew error of the transmitter or a modulator biasing error of the transmitter.

Various embodiments of transceiver chips described herein can be configured to deskew the I and Q components of a signal recovered from a modulated optical signal as well as correct errors arising due to a drift in the bias condition of the optical modulator included in the optical transmitter.

Figure 11:
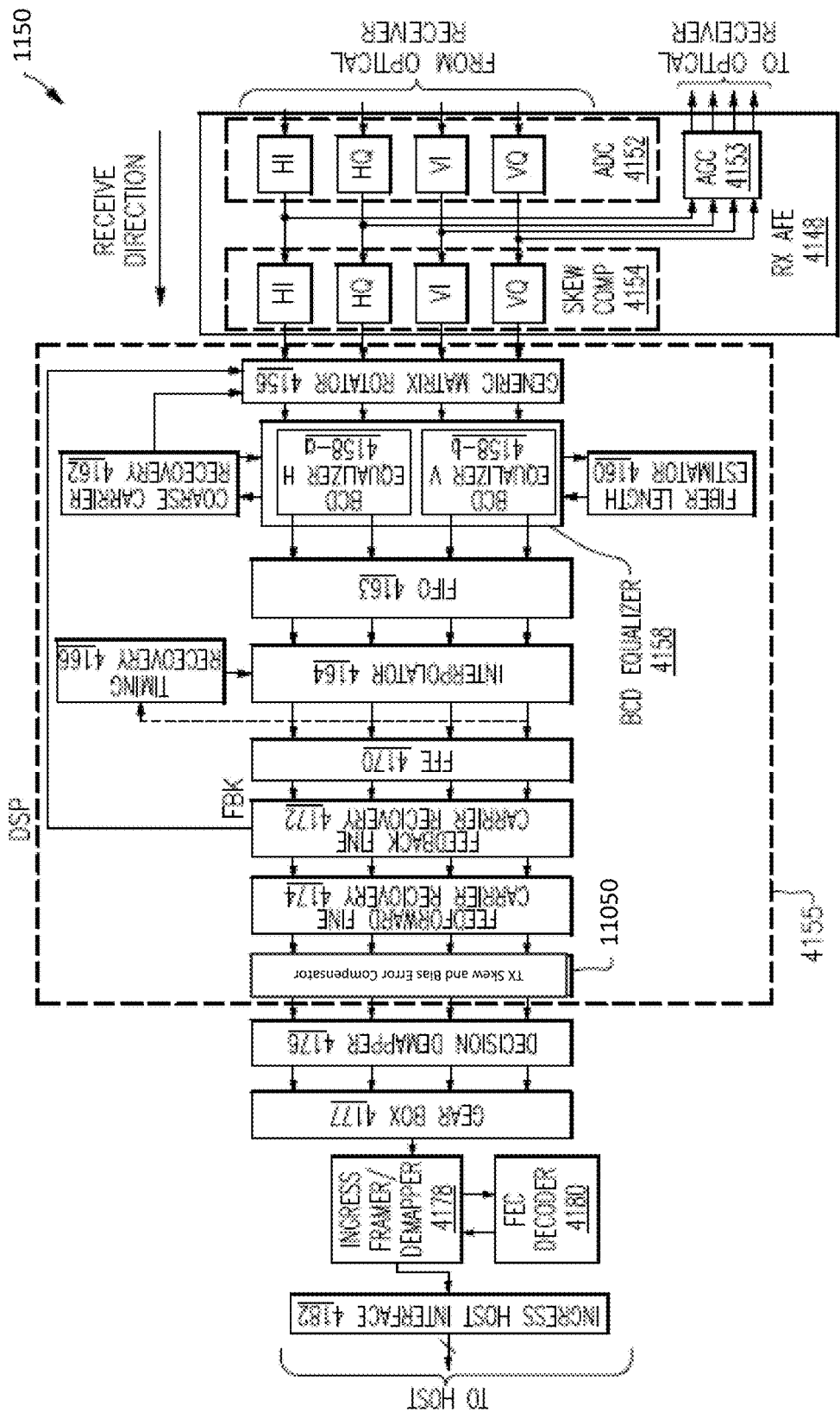
FIG. 11 is a schematic diagram of an embodiment of a receive path of an optical transceiver system including a transmitter skew and bias error compensator.

FIG. 11 is a schematic diagram of an embodiment of a receive path of an optical transceiver system 1150 including a transmitter skew and bias error compensator 11050 that is configured to deskew the I and Q components of a signal recovered from a modulated optical signal as well as correct errors in the bias controller maintaining the bias condition of the optical modulator included in the optical transmitter. The transmitter skew and bias error compensator 11050 can also be referred to in as a transmitter error compensation system or a two-dimensional skew and bias error compensator.

In the illustrated embodiment, the transmitter skew and bias error compensator 11050 is disposed between the feedforward fine carrier recovery block 4174 and the decision mapper or slicer 4176. The input signals to the transmitter skew and bias error compensator 11050 can be compensated for a variety of impairments including but not limited to compensation for phase noise of the optical carrier, chromatic dispersion compensation, and/or intersymbol interference (ISI) correction. However, in the illustrated embodiment, the input to the transmitter skew and bias error compensator 11050 need not compensated for transmitter skew or errors of the bias controller.

Although FIG. 11 illustrates one embodiment of a receive path that can include a transmitter error compensation system, a transmitter error compensation system can be included in other implementations of receive paths.

Figure 12:
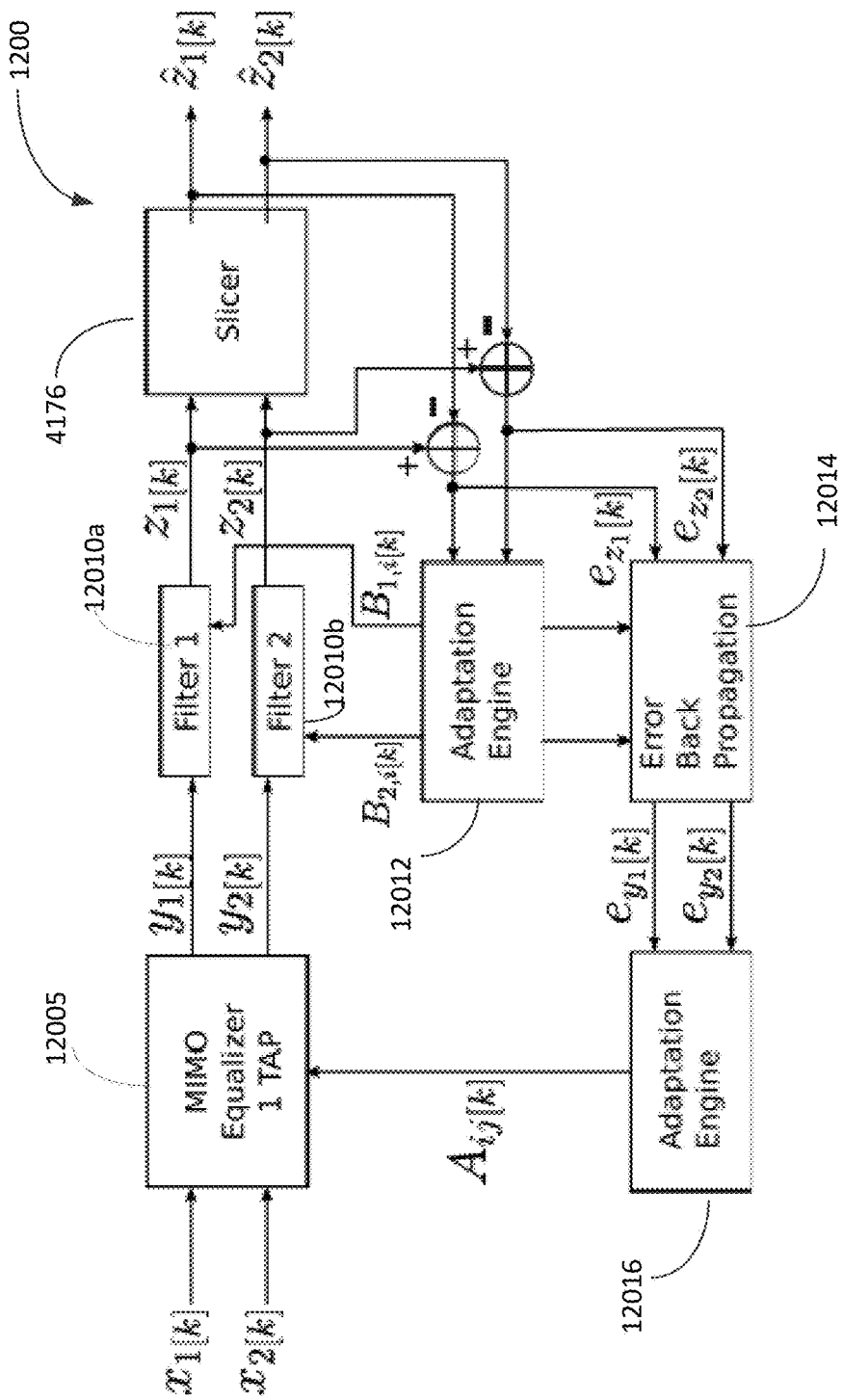
FIG. 12 is a schematic diagram of an embodiment of a transmitter skew and bias error compensator that can be included in the receive path of an optical transceiver system.

FIG. 12 is a schematic diagram of an embodiment of a transmitter skew and bias error compensator 1200 included in the receive path of an optical transceiver system, such as the receive path of the optical transceiver 1150 depicted in FIG. 11. The transmitter skew and bias error compensator 1200 of FIG. 12 includes a MIMO equalizer 12005, a first SISO equalizer 12010a, a second SISO equalizer 12010b, a slicer 4176, a first adaption engine 12012, an error back propagation block 12014, and a second adaption engine 12016.

In the illustrated embodiment, the forward path of the transmitter skew and bias error compensator 1200 includes a 2×2 multiple input multiple output (MIMO) equalizer 12005 followed by two single input single output (SISO) equalizers 12010a and 12010b. The MIMO equalizer 12005 can be memoryless while the SISO equalizers 12010a and 12010b can be configured to store one or more previous input samples. For example, in some embodiments, the SISO equalizers 12010a and 12010b can be configured as N+1 tap filters that are configured to store N previous input samples. In various embodiments, N can have a value between 2 and 64 (e.g., 2, 4, 8, 16, 32, etc.) The MIMO equalizer 12005 can be configured to apply a two-dimensional transformation based on a 2×2 real-matrix to a two-dimensional signal having a first dimension corresponding to the I-component of the received signal and a second dimension corresponding to the Q-component of the received signal.

The MIMO equalizer 12005 can be configured to compensate for errors associated with the bias controller. Additionally, the SISO equalizers 12010a and 12010b can be configured to correct for transmitter skew and DC-offset in the optical transmitter. The MIMO equalizer 12005 and the SISO equalizers 12010a and 12010b can be configured to correct for other signal impairments in addition to errors associated with bias controller, transmitter skew and DC-offset.

In some embodiments, the 2-stage MIMO equalizer followed with SISO equalizers can be replaced by an array of 2×2 MIMO equalizers. However, implementing a transmitter error compensation system to include a cascade of a MIMO equalizer followed by SISO equalizers can reduce hardware complexity, area, and/or power consumption, thereby enhancing performance.

Figure 13:
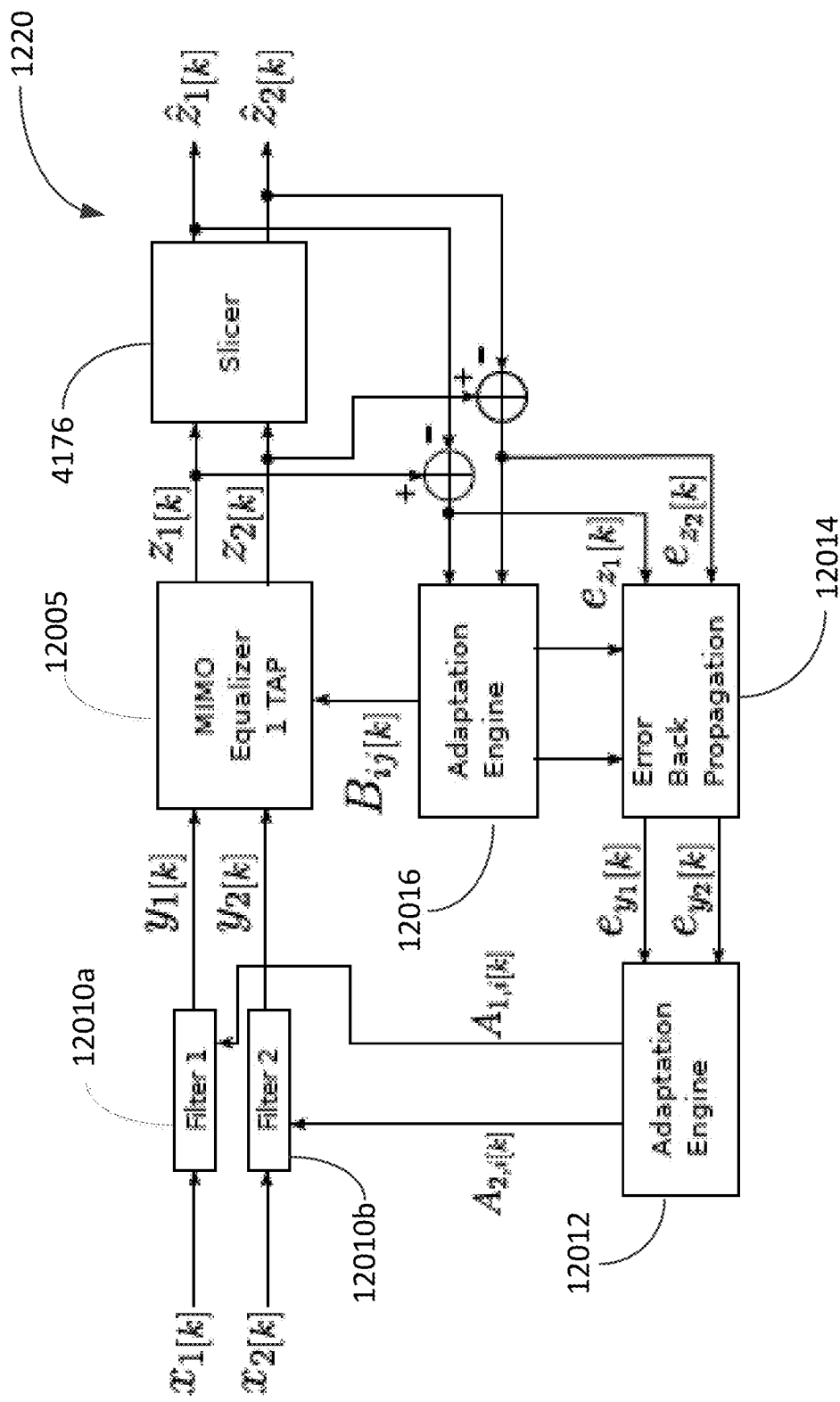
FIG. 13 is a schematic diagram of another embodiment of a transmitter skew and bias error compensator included in the receive path of an optical transceiver system.

The architecture of the forward path of the transmitter skew and bias error compensator 1200 is configured for systems in which the I and Q components are skewed at the transmitter before the distortion due to errors/drifts in the bias controller are introduced. The order of the MIMO equalizer 12005 and the SISO equalizers 12010a and 12010b can be reversed, as depicted in FIG. 13, in systems in which transmitter skew effects are introduced after bias controller errors are introduced.

Referring to FIG. 12, k refers to the discrete time index; $x_1[k]$ and $x_2[k]$ are the real and imaginary components corresponding to the I and Q components of the received signal that are input to the transmitter skew and bias error compensator 1200. Additionally, $y_1[k]$ and $y_2[k]$ are the real and imaginary components of the received signal after compensating for errors associated with the bias controller; $z_1[k]$ and $z_2[k]$ are the real and imaginary components of the received signal after compensating for errors associated with the bias controller, and the transmitter skew and DC offset; $\hat{z}_1[k]$ and $\hat{z}_2[k]$ are the real and imaginary components of the expected received signal. The expected received signal can be generated as a detected version of $z_1[k]$ and $z_2[k]$ and/or by using a training sequence that is known at the receiver; $e_{z1}[k]$ and $e_{z2}[k]$ are the real and imaginary components of the output error. Furthermore, $e_{y1}[k]$ and $e_{y2}[k]$ are the real and imaginary components of the error at the output of the MIMO equalizer 12005; $A_{ij}$ with $i \in \{1, 2\}$ and $j \in \{1, 2\}$ are the coefficients of the MIMO equalizer 12005; and $B_{ij}$ with $i \in \{1, 2\}$ and $j \in \{0, 1, 2, \ldots, N\}$ are the coefficients of the SISO equalizers 12010a and 12010b.

The transmitter skew and bias error compensator 1200 is suitable for correcting for transmitter errors, including, but not limited to, transmitter skew errors and/or modulator biasing errors.

The transmitter skew and bias error compensator 1200 can also be used to compensate for linear distortion of a signal constellation association with I and Q components of a received signal. The constellation points of the signal constellation can be considered to be two-dimensional with the I-component corresponding to the first dimension and the Q-component corresponding to the second dimension. The MIMO equalizer 12005 can be configured to apply a linear two-dimensional transformation based on a 2×2 real-matrix to the two-dimensional constellation points. Accordingly, the MIMO equalizer can compensate for any linear distortion of the received constellation points.

The transmitter skew and bias error compensator 1200 can be used to provide compensation of a digital signal vector that represents a wide variety of optical signals, including, but not limited to, a multi-level quadrature amplitude modulation (QAM) signal, a discrete multitoned (DMT) modulation signal, an orthogonal frequency division multiplexing (OFDM), or a phase-shift keying (PSK) signal.

The transmitter skew and bias error compensator 1200 provides compensation to I and Q components of a digital signal vector. In implementations using dual-polarization modulation signals, two instantiations of the transmitter skew and bias error compensator 1200 can be included to provide compensation of digital data associated with horizontal and vertical polarizations.

The transference function for some embodiments of the MIMO equalizer can be mathematically represented by equation (1) below:

$$\begin{bmatrix} y_1[k] \\ y_2[k] \end{bmatrix} = \begin{bmatrix} A_{1,1}[k] & A_{1,2}[k] \\ A_{2,1}[k] & A_{2,2}[k] \end{bmatrix} \cdot \begin{bmatrix} x_1[k] \\ x_2[k] \end{bmatrix} \quad (1)$$

The transference function for some embodiments of the SISO equalizers with N+1 taps can be mathematically represented by equation (2) below:

$$z_j[k] = B_{j,N}[k] + \sum_{i=0}^{N-1} y_j[k-1] \cdot B_{j,i}[k] \quad (2)$$

The term $B_{j,N}[k]$ in equation (2) above provides DC offset compensation and the term $$\sum_{i=0}^{N-1} y_j[k-1] \cdot B_{j,i}[k]$$

in equation (2) above provides TX skew compensation. In some embodiments, the MIMO equalizer 12005 can also be configured to provide ISI compensation at the transmitter.

In various embodiments, the coefficients $B_{j,i}[k]$ of the SISO equalizers 12010a and 12010b can be obtained using an adaptive algorithm, such as, for example, a least mean square (LMS) stochastic gradient algorithm. An adaptation engine 12012 can be used to implement the adaptive algorithm to obtain the coefficients $B_{j,i}[k]$. Using the adaptive algorithm, the coefficients $B_{j,i}[k]$ can be obtained using the equation (3) below:

$$B_{j,i}[k+1] = \begin{cases} 1 & \text{if } i = \lfloor N/2 \rfloor \\ B_{j,i}[k] - \alpha \cdot e_{z_j}[k] & \text{if } i = N \\ B_{j,i}[k] - \alpha \cdot y_j[k-i] \cdot e_{z_j}[k] & \text{other} \end{cases} \quad (3)$$

In equation (3) above, $\alpha \in R$ is the adaptation step. The adaptive algorithm is configured to force the center coefficient $B_{j,N/2}[k]$ to have a value of 1. Setting the center coefficient $B_{j,N/2}[k]$ to 1 can advantageously avoid instabilities when the SISO and MIMO adaptation algorithms are implemented simultaneously.

The coefficients $A_{j,i}[k]$ of the MIMO equalizer 12005 can also be obtained using an adaptive algorithm, such as, for example, a least mean square (LMS) stochastic gradient algorithm. An adaptation engine 12016 can be used to implement the adaptive algorithm to obtain the coefficients $A_{j,i}[k]$ using equation (4) below:

$$A_{i,j}[n+1] = A_{i,j}[n] - \beta \cdot x_j[n] \cdot e_{y_i}[n] \quad (4)$$

In equation (4) above, $\beta \in R$ is the adaptation step and $e_{y_i}[n]$ is the back-propagation of the error $e_{z_i}[k]$ through the SISO filter. The back-propagation error $e_{y_i}[n]$ can be calculated using the back-error propagation block 12014. The back-error propagation block 12014 can calculate the $e_{y_i}[n]$ using the equation (5) below:

$$e_{y_i}[n] = \sum_{k=n}^{n+N-1} e_{z_i}[k] \cdot B_{i,k-n}[k] \quad (5)$$

If the skew is not high, the main contribution in equation is from the center coefficient and thus the following approximation given by equation (6) below can be used:

$$e_{y_i}[n] = e_{z_i}[n + \lfloor N/2 \rfloor] \quad (6)$$

In the above equation (6), the noncausal characteristic of $e_{y_i}[n]$ can be solved by using a delay in the adaptation loop of the MIMO equalizer.

In various embodiments, the SISO equalizers 12010a and 12010b can be adapted to minimize the expected error energy $E\{e_{(M)}^2[k]\}$ at the input of the slicer 4176 over a time interval $k \in [-M, M]$ where $M \to \infty$ using equations 7-9 below:

$$E\{e_{(M)}^2[k]\} = E\{\sum_{k=-M}^{M} \sum_{j=1}^{2} (e_{z_j}[k])^2 \quad (7)$$

-continued $$= E\left\{\sum_{k=-M}^{M}\sum_{j=1}^{2}(z_j[k] - \hat{z}_j[k])^2\right\} \quad (8)$$

$$= E\left\{\sum_{k=-M}^{M}\sum_{j=1}^{2}\left(\left(B_{j,N}[k] + \sum_{i=0}^{N-1} y_j[k-i]B_{j,i}[k]\right) - \hat{z}_j[k]\right)^2\right\} \quad (9)$$

$$= E\left\{\sum_{k=-M}^{M}\sum_{j=1}^{2}\left(\left(B_{j,N}[k] + \sum_{i=0}^{N-1}(A_{j,1}[k-i]x_1[k-i] + A_{j,2}[k-i]x_2[k-i])B_{j,i}[k]\right) - \hat{z}_j[k]\right)^2\right\} \quad (10)$$

The derivative of the error with respect to $A_{p,q}[n]$ can be computed using the equations (11) and (12) below:

$$\frac{\partial}{\partial A_{p,q}[n]} E\{e_{(M)}^2[k]\} = E\left\{2 \cdot \sum_{k=-M}^{M} e_{z_p}[k] \cdot x_q[n] \cdot B_{p,k-n}[k]\right\} \quad (11)$$

$$= 2 \cdot E\{x_q[n] \cdot \sum_{k=-M}^{M} e_{z_p}[k] \cdot B_{p,k-n}[k]\} \quad (12)$$

The term $$\sum_{k=-M}^{M} e_{z_p}[k] \cdot B_{p,k-n}[k]$$

represents the error $e_{y_p}[n]$. The instant (stochastic) gradient can be computed as described in equation (12) but without the expectation operator $E\{\ \}$. Therefore, the adaptation algorithm provides the result given by equation (13) below:

$$A_{p,q}[n+1] = A_{p,q}[n] - \beta \cdot x_q[n] \cdot e_{y_p}[n] \quad (13)$$

In equation (13) above, b is the adaptation step and the corresponding error $e_{y_p}[n]$ is given by equation (14) below:

$$e_{y_p}[n] = \sum_{k=n}^{n+N-1} e_{z_p}[k] \cdot B_{p,k-n}[k] \quad (14)$$

Accordingly, in the illustrated embodiment, the MIMO equalizer 12005 generates an equalized digital signal vector that is compensated for modulator biasing errors. Additionally, the first and second SISO equalizers 12010a, 12010b generate a compensated digital signal vector by compensating an I component and a Q component, respectively, of the equalized digital signal vector for transmitter skew errors. The compensated digital signal vector is sliced by the slicer 4176 to generate an output digital signal vector. The first adaption engine 12012 controls the coefficients of the SISO equalizers based on a first error signal that is based on a difference between the output digital signal vector and the compensated digital signal vector. Additionally, the error back propagation block 12014 generates a second error signal based on the first error signal and coefficients of the SISO equalizers, and the second adaption engine 12016 processes the second error signal to control the coefficients of the MIMO equalizer 12005.

FIG. 13 is a schematic diagram of another embodiment of a transmitter skew and bias error compensator 1220 included in the receive path of an optical transceiver system. The transmitter skew and bias error compensator 1220 of FIG. 13 is similar to the transmitter skew and bias error compensator 1200 of FIG. 12, except that the order of the MIMO equalizer 12005 and SISO equalizers 12010a, 12010b is reversed.

The transmitter skew and bias error compensator 1220 can be suitable for optical communication systems in which transmitter skew effects are introduced after bias controller errors are introduced. Additional details of the transmitter skew and bias error compensator 1220 can be similar to those described earlier.

Figure 14:
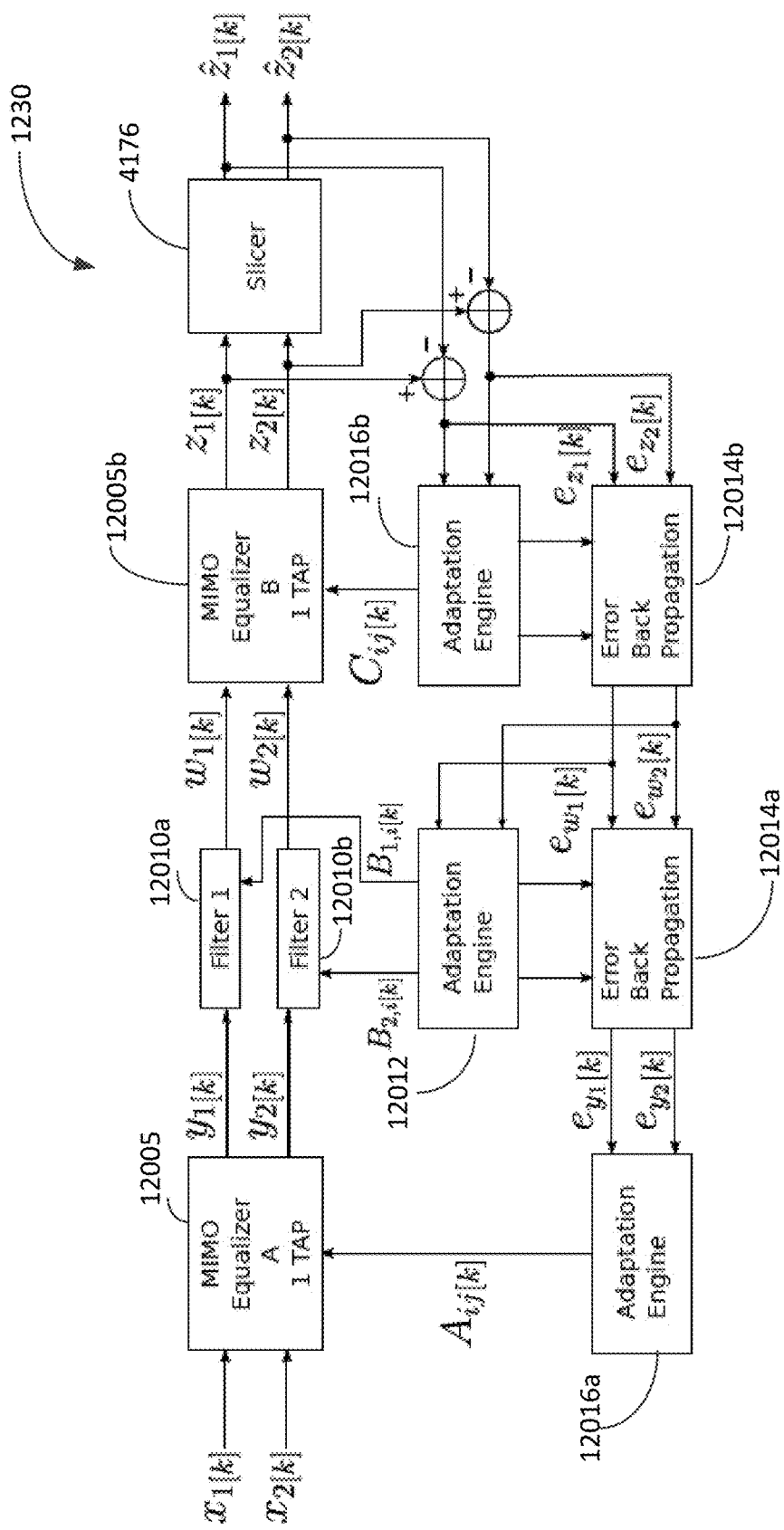
FIG. 14 is a schematic diagram of yet another embodiment of a transmitter skew and bias error compensator included in the receive path of an optical transceiver system.

FIG. 14 is a schematic diagram of another embodiment of a transmitter skew and bias error compensator 1230 included in the receive path of an optical transceiver system. The transmitter skew and bias error compensator 1230 of FIG. 14 is similar to the transmitter skew and bias error compensator 1200 of FIG. 12, except that the transmitter skew and bias error compensator 1230 of FIG. 14 further includes a second or additional MIMO equalizer 12005b, which is included between the SISO equalizers 12010a-12010b and the slicer 4716. Furthermore, an additional adaption engine 12016b is included to control the coefficients of the additional MIMO equalizer 12005b, and an additional error back propagation circuit 12014b is included as shown in FIG. 14.

In various embodiments, it may be advantageous to provide an additional MIMO equalizer 12005b at the output of the SISO equalizers 12010a and 12010b as depicted in FIG. 14. For example, the additional MIMO equalizer 12005b provides a number of advantages, including, for example, the additional MIMO equalizer 12005 can provide an additional distortion compensation for effects that many practical implementations of the transmitter skew and bias error compensator may not be able to correct without correcting/compensating for the transmitter skew. Furthermore, because the noise level is smaller after the transmitter skew compensation, it is possible to track fast dynamical distortions that the first MIMO equalizer 12005 of many practical implementations may not be able to track.

Additional details of the transmitter skew and bias error compensator 1230 can be similar to those described earlier.

Figure 15:
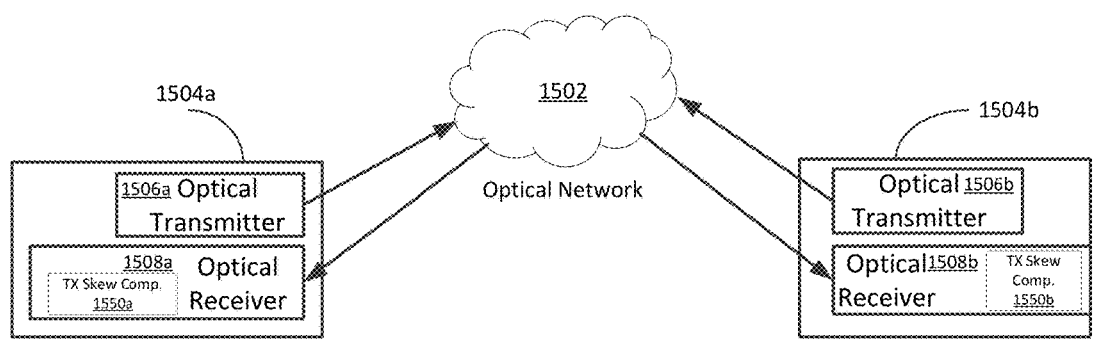
FIG. 15 is a schematic diagram of an optical communication system in communication with another optical communication system via an optical network.

FIG. 15 is a schematic diagram of an optical communication system 1504a in communication with another optical communication system 1504b via an optical network 1502. The optical communication system 1504a includes an optical transmitter 1506a, an optical receiver 1508a that includes a transmitter skew compensator 1550a. The optical communication system 1504b includes an optical transmitter 1506b, an optical receiver 1508b that includes a transmitter skew compensator 1550b.

The optical communication systems 1504a and 1504b can operate in a router, a server, a hub, a datacenter system, a network backhaul system, a computer, a phone system, or any other system that transmits and receives optical signals over the optical network 1502. The optical network 1502 can be a DWDM network, an OFDM network, a TDM network, etc. In various implementations, the optical communication systems 1506a and 1506b can include one or more components and functional blocks similar to one or more of the components and functional blocks of the transceiver architecture described above with reference to FIGS. 3A-3C.

The transmitter skew compensators 1550a and 1550b can include the cascaded MIMO and SISO equalizers as discussed above with reference to FIGS. 11-14 that are configured to correct for errors due to bias controllers as well as transmitter skew. The transmitter skew compensators 1550a and 1550b can be configured to calibrate the optical transmitter 1506a and/or 1506b as well as correct for skew in an uncalibrated transmitter. The transmitter skew compensators 1550a and 1550b can also be used to correct for other errors of a transmitter, including, for instance, modulator biasing errors.

Combination of Equalizer Based Skew Compensation and Transmitter Alignment Based on Timing Tone An optical communication system can include a receiver implemented that corrects for transmitter errors using a combination of equalizer based skew compensation and transmitter alignment based on timing tone. For example, a receiver can include circuitry used to generate skew compensation data based on timing tone. Additionally, the receiver can further include a transmitter skew and bias error compensator for correcting transmitter errors from calibrated and/or uncalibrated transmitters.

Accordingly, any of the tone power calculation schemes described herein, including, but not limited to, the tone power calculators and methods of tone power calculation of FIGS. 6A-9, can be used in combination with any of the equalizer-based transmitter error compensation schemes, such as those described in FIGS. 11-14.

CONCLUSION

Skew adjustment made by calculating power of the timing tone at the various harmonic frequencies (e.g., 0.5 Baud rate, Baud rate, twice the Baud rate, 4 times the Baud rate, etc.) and/or power of the side tone close to the harmonic frequencies (e.g., 0.5 Baud rate, Baud rate, twice the Baud rate, 4 times the Baud rate, etc.) can be implemented in a variety of optical communication systems supporting advanced modulation formats having a timing tone. For example, optical communication systems supporting advanced modulation formats including but not limited to a multi-level quadrature amplitude modulation (QAM) signal, a discrete multitoned (DMT) modulation signal, an orthogonal frequency division multiplexing (OFDM), or a phase-shift keying (PSK) signal (including, but not limited to, a quadrature phase-shift keying (QPSK) signal) can use the systems and methods described herein to adjust skew between the I and Q signal components in the transmitter.

The methods of adjusting skew between the I and Q signal components in the transmitter by calculating power of the timing tone at the various harmonic frequencies (e.g., 0.5 Baud rate, Baud rate, twice the Baud rate, 4 times the Baud rate, etc.) and/or power of the side tone close to the harmonic frequencies (e.g., 0.5 Baud rate, Baud rate, twice the Baud rate, 4 times the Baud rate, etc.) can be implemented by hardware, software or a combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of correcting for transmitter skew in an optical communication system, the method comprising:
    generating an optical signal using a transmitter based on an in-phase (I) component and a quadrature-phase (Q) component of a transmit signal, the optical signal having a baud rate that is based on a timing tone;

receiving the optical signal as an input to a receiver;
generating a signal vector representing the optical signal, the signal vector comprising an I component and a Q component;
calculating a power of the timing tone based on processing the signal vector using a tone power calculator, wherein calculating the power of the timing tone comprises calculating a side tone power; and
correcting for a skew of the transmitter based on the calculated power.

2. The method of claim 1, further comprising providing a plurality of different amounts of skew adjustment at the transmitter, and calculating the power of the timing tone for each of the different amounts of skew adjustment.

3. The method of claim 2, further comprising generating skew adjustment data based on the power calculations, and storing the skew adjustment data in a programmable memory associated with the transmitter.

4. The method of claim 1, further comprising changing an amount of skew between the I component and the Q component of the transmit signal based on a step size, and iteratively revising the step size until the calculated power indicates that the transmitter is substantially aligned.

5. The method of claim 1, wherein calculating the side tone power comprises calculating a value of a square of a complex signal, wherein the complex signal comprises the I component and the Q component of the signal vector.

6. The method of claim 1, wherein the optical signal comprises a multi-level quadrature amplitude modulation (QAM) signal, a discrete multitoned (DMT) modulation signal, an orthogonal frequency division multiplexing (OFDM), or a phase-shift keying (PSK) signal.

7. The method of claim 1, wherein the signal vector comprises data representing a single polarization modulation or a dual-polarization modulation.

8. A method of correcting for transmitter skew in an optical communication system, the method comprising:
generating an optical signal using a transmitter based on an in-phase (I) component and a quadrature-phase (Q) component of a transmit signal, the optical signal having a baud rate that is based on a timing tone;
receiving the optical signal as an input to a receiver;
generating a signal vector representing the optical signal, the signal vector comprising an I component and a Q component;
calculating a power of the timing tone based on processing the signal vector using a tone power calculator, wherein calculating the power of the timing tone comprises calculating a tone power, and wherein calculating the tone power comprises calculating a value of the square of the absolute value of a complex signal, wherein the complex signal comprises the I component and the Q component of the signal vector; and
correcting for a skew of the transmitter based on the calculated power.

9. A method of correcting for transmitter skew in an optical communication system, the method comprising:
generating an optical signal using a transmitter based on an in-phase (I) component and a quadrature-phase (Q) component of a transmit signal, the optical signal having a baud rate that is based on a timing tone;
receiving the optical signal as an input to a receiver;
generating a signal vector representing the optical signal, the signal vector comprising an I component and a Q component;
calculating a power of the timing tone based on processing the signal vector using a tone power calculator, wherein calculating the power of the timing tone comprises determining a value of a metric, wherein the metric comprises a function of at least one of a tone power or a side tone power of the timing tone; and
correcting for a skew of the transmitter based on the calculated power.

10. The method of claim 9, wherein determining the value of the metric comprises determining a weighted combination of the tone power and the side tone power.

11. The method of claim 9, wherein calculating the power of the timing tone further comprises calculating a value of a square of the absolute value of a complex signal, wherein the complex signal comprises the I component and the Q component of the signal vector.

12. The method of claim 9, wherein calculating the power of the timing tone further comprises calculating a value of a square of a complex signal, wherein the complex signal comprises the I component and the Q component of the signal vector.

13. An integrated circuit for an optical communications system, the integrated circuit comprising:
a receiver comprising:
an analog front-end configured to convert an analog signal vector representing an optical signal into a digital signal vector, the optical signal having a baud rate that is based on a timing tone; and
a digital signal processing circuit configured to process the digital signal vector to recover data from symbols of the optical signal, wherein the symbols change at the baud rate,
wherein the analog front-end comprises a tone power calculator configured to calculate a power of the timing tone, and to generate skew adjustment data for a transmitter based on the calculated power, wherein the tone power calculator is further configured to calculate the power of the timing tone based on determining a side tone power of the timing tone.

14. The integrated circuit of claim 13, wherein the tone power calculator is further configured to calculate the power of the timing tone based on determining a tone power of the timing tone.

15. The integrated circuit of claim 13, wherein the tone power calculator is further configured to calculate the power of the timing tone based on a value of the square of the absolute value of a complex signal representing an I component and a Q component of the analog signal vector.

16. The integrated circuit of claim 13, wherein the tone power calculator is further configured to calculate the power of the timing tone based on a value of a square of a complex signal representing an I component and a Q component of the analog signal vector.

17. The integrated circuit of claim 13, wherein the digital signal vector comprises data representing a single polarization modulation or a dual-polarization modulation.

18. The integrated circuit of claim 13, further comprising a transmitter, wherein the transmitter controls transmission of the optical signal to the receiver during a calibration cycle to align the transmitter.

19. The integrated circuit of claim 13, wherein the digital signal processing circuit further comprises a transmitter error compensation system configured to compensate the digital signal vector for at least one of a transmit skew error of the transmitter or a modulator biasing error of the transmitter, wherein the transmitter error compensation system comprises an I signal path comprising a MIMO equalizer and a first SISO equalizer, and a Q signal path comprising the MIMO equalizer and a second SISO equalizer.

20. An optical transceiver module comprising:
an optical receiver configured to receive an optical signal from an optical cable and to generate an analog signal vector representing the optical signal, wherein the optical signal has a baud rate that is based on a timing tone; and
a transceiver comprising:
   a receiver configured to process the analog signal vector to generate a digital signal vector comprising a digital representation of the analog signal vector, and to process the digital signal vector to recover data from symbols of the optical signal, wherein the symbols change at the baud rate,
   wherein the receiver comprises a tone power calculator configured to calculate a power of the timing tone, and to generate skew adjustment data based on the calculated power, wherein the tone power calculator is further configured to determine the power of the timing tone based on a value of the square of the absolute value of a complex signal representing an I component and a Q component of the analog signal vector.

21. The optical transceiver module of claim 20, wherein the tone power calculator is further configured to determine at least one of a tone power or a side tone power of the timing tone.

22. The optical transceiver module of claim 20, wherein the digital signal vector comprises data representing a single polarization modulation or a dual-polarization modulation.

23. The optical transceiver module of claim 20, wherein the transceiver further comprises a transmitter, wherein the transmitter controls transmission of the optical signal to the receiver during a calibration cycle to align the transmitter.

24. The optical transceiver module of claim 23, further comprising a programmable memory configured to store the skew adjustment data.

25. An optical transceiver module comprising:
an optical receiver configured to receive an optical signal from an optical cable and to generate an analog signal vector representing the optical signal, wherein the optical signal has a baud rate that is based on a timing tone; and
a transceiver comprising:
   a receiver configured to process the analog signal vector to generate a digital signal vector comprising a digital representation of the analog signal vector, and to process the digital signal vector to recover data from symbols of the optical signal, wherein the symbols change at the baud rate, wherein the receiver comprises a tone power calculator configured to calculate a power of the timing tone, and to generate skew adjustment data based on the calculated power, wherein the tone power calculator is further configured to determine the power of the timing tone based on a value of the absolute value of a square of a complex signal representing an I component and a Q component of the analog signal vector.

* * * * *